United States Patent
Schütz et al.

(10) Patent No.: US 12,528,783 B2
(45) Date of Patent: *Jan. 20, 2026

(54) PqsR INVERSE AGONISTS

(71) Applicant: Helmholtz-Zentrum Fur Infektionsforschung GmbH, Braunschweig (DE)

(72) Inventors: Christian Schütz, Braunschweig (DE); Martin Empting, Braunschweig (DE); Ahmed S. Ahmed, Braunschweig (DE); Mostafa Hamed, Braunschweig (DE); Rolf W. Hartmann, Braunschweig (DE); Teresa Röhrig, Braunschweig (DE); Andreas M. Kany, Braunschweig (DE); Anna K. Hirsch, Braunschweig (DE)

(73) Assignee: HELMHOLTZ-ZENTRUM FUR INFEKTIONSFORSCHUNG GMBH, Braunschweig (DE)

( * ) Notice: Subject to any disclaimer, the term of this patent is extended or adjusted under 35 U.S.C. 154(b) by 635 days.

This patent is subject to a terminal disclaimer.

(21) Appl. No.: 17/790,569

(22) PCT Filed: Dec. 30, 2020

(86) PCT No.: PCT/EP2020/088018
§ 371 (c)(1),
(2) Date: Jul. 1, 2022

(87) PCT Pub. No.: WO2021/136803
PCT Pub. Date: Jul. 8, 2021

(65) Prior Publication Data
US 2023/0286942 A1    Sep. 14, 2023

(30) Foreign Application Priority Data

Jan. 2, 2020 (EP) .................................. 20150104

(51) Int. Cl.
| | |
|---|---|
| *C07D 401/12* | (2006.01) |
| *A61K 45/06* | (2006.01) |
| *C07D 401/14* | (2006.01) |
| *C07D 403/12* | (2006.01) |
| *C07D 413/12* | (2006.01) |
| *C07D 417/12* | (2006.01) |

(52) U.S. Cl.
CPC ............ *C07D 401/12* (2013.01); *A61K 45/06* (2013.01); *C07D 401/14* (2013.01); *C07D 403/12* (2013.01); *C07D 413/12* (2013.01); *C07D 417/12* (2013.01)

(58) Field of Classification Search
None
See application file for complete search history.

(56) References Cited

U.S. PATENT DOCUMENTS

| | | | | |
|---|---|---|---|---|
| 3,873,558 | A * | 3/1975 | Grenda ................. | C07D 277/28 564/441 |
| 9,890,112 | B2 * | 2/2018 | Scherrer ............ | A61K 31/5377 |
| 10,456,440 | B2 * | 10/2019 | Ehrhardt .............. | A61K 31/166 |
| 11,883,387 | B2 * | 1/2024 | Ahmed ................ | C07D 403/12 |

FOREIGN PATENT DOCUMENTS

| | | |
|---|---|---|
| CN | 108 003 151 B | 11/2019 |
| JP | 2002-510293 A | 4/2002 |
| JP | 2008-519021 A | 6/2008 |
| JP | 2018-535949 A | 12/2018 |
| JP | 2021-529203 A | 10/2021 |
| WO | 2008/098143 A2 | 8/2008 |
| WO | 2012/116010 A2 | 8/2012 |
| WO | 2014/176258 A1 | 10/2014 |
| WO | 2016/007837 A1 | 1/2016 |

(Continued)

OTHER PUBLICATIONS

Zender, M. et al. Flexible Fragment Growing Boosts Potency of Quorum-Sensing Inhibitors against Pseudomonas aeruginosa Virulence. ChemMedChem, 2019, 15, 2, 188-194 (Year: 2019).*
Zender, M. et al. ChemMedChem, 2019, 15, 2, 188-194 (Year: 2019).*
Howard, S. et al. ACS Med. Chem. Lett. 2013, 4, 12, 1208-1212 (Year: 2013).*
International Search Report issued Mar. 3, 2021 in PCT Application No. PCT/EP2020/088018.
D. Seenaiah et al., "Synthesis and antimicrobial activity of pyrimidinyl bi(benzazoles)" Medicinal Chemistry Research, 26:2, pp. 431-441.
R Frei et al. (2012) Angew Chem Int Ed Engl 51:5226-5229.

(Continued)

*Primary Examiner* — Clinton A Brooks
*Assistant Examiner* — Nicola Maria Bauer
(74) *Attorney, Agent, or Firm* — Fox Rothschild LLP; Peter F. Corless

(57) ABSTRACT

The present invention relates to a compounds according to general formula (I), which acts as an inverse agonist of PqsR (the currently only known receptor for the *Pseudomonas* Quinolone Signal (PQS), sometimes also referred to as MvfR); to a pharmaceutical composition containing one or more of the compound(s) of the invention; to a combination preparation containing at least one compound of the invention and at least one further active pharmaceutical ingredient; and to uses of said compound(s), including the use as a medicament, e.g. the use in the treatment or prophylaxis of a bacterial infection, especially a *Pseudomonas aeruginosa* or *Burkholderia* infection.

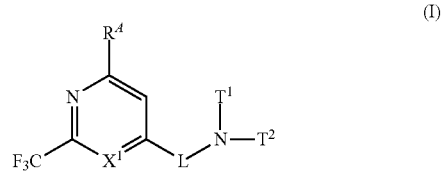

(I)

15 Claims, No Drawings

(56) References Cited

FOREIGN PATENT DOCUMENTS

| | | | |
|---|---|---|---|
| WO | 2016/040764 A1 | 3/2016 | |
| WO | 2016/112088 A1 | 7/2016 | |
| WO | WO-2016144797 A1 * | 9/2016 | ........... C07D 213/82 |
| WO | 2019/079759 A1 | 4/2019 | |
| WO | 2020/007938 A1 | 1/2020 | |

OTHER PUBLICATIONS

L Yang et al. (2009) Antimicrob Agents Chemother 53:2432-2443.
C.T. O'Loughlin et al. (2013) Proc Natl Acad Sci U S A 110:17981-17986.
M Hentzer et al. (2003) EMBO J 22:3803-3815.
M. Hentzer et al. (2002) Microbiology 148:87-102.
TB Rasmussen et al. (2005) Microbiology 151:1325-134.
TH Jakobsen et al. (2012) Antimicrob Agents Chemother 56:2314-2325.
S. Hinsberger et al. (2014) Eur J Med Chem 76C:343-351.
MP Storz et al. (2013) ACS Chem Biol 8:2794-2801.
JH Sahner et al. (2013) J Med Chem 56:8656-8664.
E Weidel et al, (2013) J Med Chem 56:6146-6155.
MW Calfee et al. (2001) Proc Natl Acad Sci U S A 98:11633-11637.
D Pistorius et al. (2011) Chembiochem 12:850-853.
B Lesic et al. (2007) PLoS Pathog 3:1229-1239.
MP Storz et al. (2012) J Am Chem Soc 134:16143-16146.
JP Coleman et al. (2008) J Bacteriol 190:1247-1255.
T Klein et al. (2012) ACS Chem Biol 7:1496-1501.
M Zender et al. (2013) J Med Chem 56:6761-6774.
C Lu et al. (2012) Chem Biol 19:381-390.
C Lu et al. (2014) Angew Chem Int Ed Engl 53:1109-1112.
A Ilangovan et al. (2013) PLoS Pathog 9:e1003508.
CK Maurer et al. (2013) J Pharm Biomed Anal 86C:127-134.
Y Zhang et al. (1992) Appl Environ Microbiol 58:3276-3282.
M. Starkey et al., "Identification of Anti-virulence Compounds . . . " PLOS Pathogens, vol. 10, Aug. 2014, p. 1-17.
Notice of Reasons for Rejection issued Sep. 26, 2023 in Japanese Patent Application No. 2022-540896 (English translation provided).

* cited by examiner

PqsR INVERSE AGONISTS

This Application is a U.S. National Stage Entry of the International Patent Application No. PCT/EP2020/088018, filed on Dec. 30, 2020, which claims the benefit of European Patent Application No. 20150104.6, filed on Jan. 2, 2020. The entire contents of these applications are incorporated herein by reference in their entirety.

FIELD OF THE INVENTION

The present invention relates to a compound according to general formula (I), which acts as an inverse agonist of PqsR (the currently only known receptor for the *Pseudomonas* Quinolone Signal (PQS), sometimes also referred to as MvfR); to a pharmaceutical composition containing one or more of the compound(s) of the invention; to a combination preparation containing at least one compound of the invention and at least one further active pharmaceutical ingredient; and to uses of said compound(s), including the use as a medicament, e.g. the use in the treatment or prophylaxis of a bacterial infection, especially a *Pseudomonas aeruginosa* or *Burkholderia* infection.

BACKGROUND OF THE INVENTION

In view of the rapid decline in the effectiveness of antibiotics due to the emergence of resistance, there is a need for a constant supply of new compounds for effective treatment of infections. The development of antimicrobial resistance is mainly attributed to the overuse of antibiotics interfering with essential metabolic processes in bacteria. Moreover, bacteria living in biofilms, sessile cell communities embedded in a matrix of extracellular polymeric substances showing reduced metabolic activity and growth rate, exhibit up to 1000-fold higher resistance against antibiotics than free-living bacteria. Thus, novel therapeutic approaches that aim at reducing bacterial pathogenicity by interfering with bacterial virulence and biofilm formation instead of their metabolic activity are considered as highly favorable and are urgently needed.

The opportunistic pathogen *P. aeruginosa* causes severe and fatal infections including such of the urinary tract, of the gastrointestinal tract, of chronic and burnt wounds, of the eyes, of the ears, and of the lungs. Its pathogenicity is strongly related to the expression of virulence factors causing progressive tissue damage and biofilm formation hindering a successful drug therapy. The regulation of pathogenicity is based on a cell-density dependent intercellular communication system known as quorum sensing (QS).

*P. aeruginosa* uses as signal molecules N-acyl-L-homoserine lactones (AHLs) for the las and rhl QS systems and 2-alkyl-4-(1H)-quinolones (AQs) for the pqs QS system. The latter is restricted to *Pseudomonas* and *Burkholderia* species allowing for selective therapy with pqs QS inhibitors. While *Pseudomonas* and *Burkholderia* both produce 2-heptyl-4-hydroxyquinoline (HHQ), *Pseudomonas* uniquely uses the *Pseudomonas* quinolone signal (PQS) as signal molecule. PQS and its biosynthetic precursor HHQ serve as the natural ligands and agonists of the key DNA-binding receptor PqsR. This transcriptional regulator fine-tunes a large set of genes, notably such involved in the biosynthesis of HHQ and in the production of virulence factors such as pyocyanin and lectins. Regarding biofilms, the production of extracellular DNA (eDNA) and lectins, both main biofilm matrix components, is controlled by the pqs QS system. A pqsR mutant of *P. aeruginosa* is pqs QS-deficient, does not produce any pyocyanin or lectin A, shows reduced eDNA production, and displays reduced pathogenicity in mice.

To date, a number of compounds have been discovered that target QS in *P. aeruginosa*. The majority of these compounds has been reported to interfere with the AHL-based QS systems in *Pseudomonas* either via direct interaction with the receptors LasR [1, 2] or RhlR [3], at the post-transcriptional level [4-6], or at superior regulatory systems [7]. However, except an extract from *Allium sativum* (garlic), that exhibited no significant improvement of lung function in a clinical trial, these QS inhibitors have been only used in preclinical studies. Whereas AHL-mediated QS is widespread among Gram-negative bacteria, interference with pqs QS allows for selective therapy avoiding adverse effects on beneficial bacterial consortia present in the host. A few pqs QS inhibitors have been described acting as blockers of the signal molecule biosynthesis [8-16] or as antagonists of the receptor PqsR [17-21]. A QS inhibitor based on anthranilate structure, methyl anthranilate, was shown to inhibit PQS formation and the production of the virulence factor elastase at millimolar concentrations [12]. QS inhibitors targeting the enzyme PqsA were able to reduce the production of signal molecules HHQ and PQS ($IC_{50}$: ~100 µM for 6FABA) [14, 16, 22] and enhanced the survival rate of *Pseudomonas*-infected mice in a thermal injury mice model [14]. However, high concentrations were necessary to obtain an in cellulo or in vivo effect. Inhibitors of the enzyme PqsD were able to reduce the biovolume of a *P. aeruginosa* biofilm [15], however, did not exhibit any anti-virulence properties (no effect on virulence factor pyocyanin, no effect on the survival of *Pseudomonas*-infected *Galleria mellonella* larvae; unpublished data). Zender and Klein reported PqsR antagonists affecting the production of virulence factor pyocyanin, however with moderate potency ($IC_{50}$ values in the double-digit micromolar range). Furthermore, these compounds did not inhibit biofilm formation (unpublished data). Quinazoline-based PqsR antagonists developed in the group of Paul Williams were reported to exhibit antivirulence activity. However, the most promising compound was only moderately active in reducing pyocyanin production ($IC_{50}$~50 µM in a less PQS- and pyocyanin-producing *P. aeruginosa* strain). A reduction in biomass of a *P. aeruginosa* biofilm by this compound was observed, however at an unknown concentration. Another potent antagonist of PqsR is 2-heptyl-6-nitro-4-oxo-1,4-dihydroquinoline-3-carboxamide and was developed in the group of Anke Steinbach and Rolf W. Hartmann [20]. 2-heptyl-6-nitro-4-oxo-1,4-dihydroquinoline-3-carboxamide is highly affine to PqsR ($IC_{50}$=35 nM in *E. coli* reporter gene assay, $IC_{50}$=400 nM in *P. aeruginosa* reporter gene assay), strongly reduces signal molecule production (HHQ production by 54% and PQS by 37% at 15 µM), and shows excellent anti-virulence potency in cellulo (inhibition of virulence factor pyocyanin production: $IC_{50}$=2 µM) and in in vivo animal infection models. Further reported PqsR-targeting compounds have been described by the working group of Laurence Rahme (DOI: 10.1371/journal.ppat.1004321; WO2012116010) and in follow-up patents by Spero Therapeutics (WO2014176258, WO2016040764, WO2016007837, WO2016112088). These compound classes show activity against pyocyanin and alkylquinolone production in the nanomolar range. The compounds commonly referred to as M64 and SPR-00305 (205 in WO2016112088) suffer from pharmakokinetic drawbacks (e.g., low metabolic stability).

All in all, the hitherto known compounds show a number of deficiencies hampering their utility as a drug, including low metabolic stability, low bioavailability/solubility, low selectivity and toxicity.

In view of the deficits of the prior art compounds and the severe conditions associated with antibiotic resistant microorganisms, both acute and chronic, there is a need for novel anti-pathogenic compounds that use a different mechanism of action than "classical" antibiotics.

Summary and Description of the Invention

The present invention was made in view of the prior art and the needs described above, and, therefore, the object of the present invention is to provide new PqsR inverse agonsists according to general formula (I) exhibiting both, anti-virulence and anti-biofilm activity, to thereby permit an effective treatment of bacterial infections. More specifically, the present invention provides compounds having inverse agonistic activity on PqsR, preferably PqsR inverse agonists having one or more improved properties, e.g. biofilm inhibition (biovolume reduction and/or eDNA suppression), high antivirulence activity, an improved pharmacokinetic and/or physiochemical property, including bioavailability, solubility, and metabolic stability. Other objects of the present invention are to provide a pharmaceutical composition comprising at least one PqsR inverse agonist as described herein; a combination preparation containing at least one compound of the invention and at least one further active pharmaceutical ingredient; and uses of the compound(s) of the invention, including the use as a medicament, e.g. the use in the treatment or prophylaxis of a bacterial infection, especially a *Pseudomonas aeruginosa* or *Burkholderia* infection.

These objects are solved by the subject matter of the attached claims as will become apparent upon reference to the following description and definitions.

The present invention relates to:
[1] A compound of the formula (I):

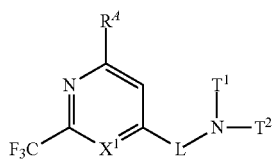

or a pharmacologically acceptable salt thereof,
wherein
$R^A$ represents a hydrogen atom, a halogen atom, $NH_2$ or $NH(C_{1-3}alkyl)$;
$X^1$ represents CH or N;
L is a group represented by formula (L-1), (L-2) or (L-3):

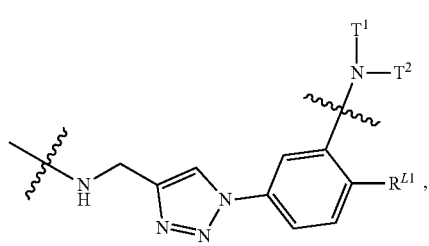

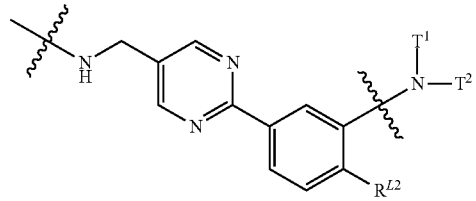

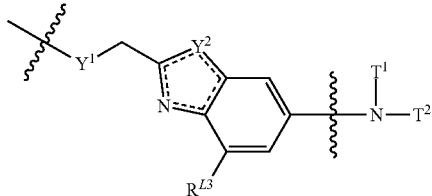

wherein
$R^{L1}$, $R^{L2}$ and $R^{L3}$ each, independently of one another, represents a hydrogen atom, F, Cl; or a $(C_1-C_3)$alkyl group, which may be substituted by one or more, identical or different, group(s) selected from a halogen atom, OH, =O, and $NH_2$;
$Y^1$ and $Y^2$ each, independently of one another, is NH, O, or S;
each "- - - - -", independently of one another, represents a single bond or a double bond, wherein at least one "- - -" in the ring of formula (L-3) is a double bond;
$T^1$ is a hydrogen atom; and $T^2$ represents a hydrogen atom; or an aryl, heteroaryl, aralkyl or hetero-aralkyl group, all of which groups may be substituted by one, two or more, identical or different, group(s) selected from: a halogen atom, OH, =O, $NH_2$, $(C_1-C_3)$alkyl which may be substituted by one or more, identical or different, group(s) selected from a halogen atom, OH, =O, and $NH_2$; $(C_1-C_3)$alkoxy which may be substituted by one or more, identical or different, group(s) selected from a halogen atom, OH, =O, and $NH_2$; and $C(O)NR^{T1}R^{T2}$;
$R^{T1}$ and $R^{T2}$ each, independently of one another, represents a hydrogen atom or a $(C_1-C_3)$alkyl group, which may be substituted by one or more, identical or different, group(s) selected from a halogen atom, OH, =O, and $NH_2$;
or
$T^1$ and $T^2$ both represent O.

Compounds are usually described herein using standard nomenclature or the definitions presented below. For compounds having asymmetric centers, it should be understood that, unless otherwise specified, all of the optical isomers and mixtures thereof are encompassed. Compounds with two or more asymmetric elements can also be present as mixtures of diastereomers. In addition, compounds with carbon-carbon double bonds may occur in Z—and E-forms, with all isomeric forms of the compounds being included in the present invention unless otherwise specified. Where a compound exists in various tautomeric forms, a recited compound is not limited to any one specific tautomer, but rather is intended to encompass all tautomeric forms. It will be apparent that the compound of the invention may, but need not, be present as a hydrate, solvate or non-covalent complex. In addition, the various crystal forms and polymorphs are within the scope of the present invention, as are prodrugs of the compound of the invention. Recited compounds are further intended to encompass compounds in which one or more atoms are replaced with an isotope, i.e., an atom having the same atomic number but a different mass number. By way of general example, and without limitation, isotopes of hydrogen include tritium and deuterium and isotopes of carbon include $^{11}C$, $^{13}C$, and $^{14}C$.

Compounds according to the formulas provided herein, which have one or more stereogenic center(s), have an enantiomeric excess of at least 50%. For example, such compounds may have an enantiomeric excess of at least 60%, 70%, 80%, 85%, 90%, 95%, or 98%. Some embodiments of the compounds have an enantiomeric excess of at least 99%. It will be apparent that single enantiomers (optically active forms) can be obtained by asymmetric synthesis, synthesis from optically pure precursors or by resolution of the racemates. Resolution of the racemates can be accomplished, for example, by conventional methods such as crystallization in the presence of a resolving agent, or chromatography, using, for example a chiral HPLC column.

The compound according to the invention is described herein using a general formula that includes variables such as, e.g. L, $R^A$, $R^{L1}$—$R^{L3}$, $R^{T1}$—$R^{T2}$, $T^1$-$T^2$, $X^1$, and $Y^1$-$Y^2$. Unless otherwise specified, each variable within such a formula is defined independently of any other variable, and any variable that occurs more than one time in a formula is defined independently at each occurrence. Thus, for example, if a group is shown to be substituted with 0-2 R*, the group may be unsubstituted, or substituted with 1 or 2 group(s) R*, wherein R* at each occurrence is selected independently from the corresponding definition of R*. Also, combinations of substituents and/or variables are permissible only if such combinations result in stable compounds, i.e., compounds that can be isolated, characterized and tested for biological activity.

As used herein, a wording defining the limits of a range of length such as, e. g., "from 1 to 6" means any integer from 1 to 6, i. e. 1, 2, 3, 4, 5 and 6. In other words, any range defined by two integers explicitly mentioned is meant to comprise and disclose any integer defining said limits and any integer comprised in said range. For example, the term "$C_1$-$C_3$" refers to 1 to 3, i.e. 1, 2 or 3, carbon atoms. Further, the prefix "($C_{x-y}$)" as used herein means that the chain, ring or combination of chain and ring structure as a whole, indicated in direct association of the prefix, may consist of a minimum of x and a maximum of y carbon atoms (i.e. x<y), wherein x and y represent integers defining the limits of the length of the chain (number of carbon atoms) and/or the size of the ring (number of carbon ring atoms).

A "pharmacologically acceptable salt" of a compound disclosed herein is an acid or base salt that is generally considered in the art to be suitable for use in contact with the tissues of human beings or animals without excessive toxicity or carcinogenicity, and preferably without irritation, allergic response, or other problem or complication. Such pharmaceutical salts include mineral and organic acid salts of basic residues such as amines, as well as alkali or organic salts of acidic residues such as carboxylic acids.

Suitable pharmaceutical salts include, but are not limited to, salts of acids such as hydrochloric, phosphoric, hydrobromic, malic, glycolic, fumaric, sulfuric, sulfamic, sulfanilic, formic, toluenesulfonic, methanesulfonic, benzene sulfonic, ethane disulfonic, 2-hydroxyethylsulfonic, nitric, benzoic, 2-acetoxybenzoic, citric, tartaric, lactic, stearic, salicylic, glutamic, ascorbic, pamoic, succinic, fumaric, maleic, propionic, hydroxymaleic, hydroiodic, phenylacetic, alkanoic such as acetic, HOOC—$(CH_2)_n$—COOH where n is any integer from 0 to 4 (i.e., 0, 1, 2, 3, or 4) and the like.

Similarly, pharmaceutically acceptable cations include, but are not limited to sodium, potassium, calcium, aluminum, lithium and ammonium. Those of ordinary skill in the art will recognize further pharmacologically acceptable salts for the compounds provided herein. In general, a pharmacologically acceptable acid or base salt can be synthesized from a parent compound that contains a basic or acidic moiety by any conventional chemical method. Briefly, such salts can be prepared by reacting the free acid or base forms of these compounds with a stoichiometric amount of the appropriate base or acid in water or in an organic solvent, or in a mixture of the two. Generally, the use of nonaqueous media, such as ether, ethyl acetate, ethanol, isopropanol or acetonitrile, is preferred.

A "substituent," as used herein, refers to a molecular moiety that is covalently bonded to an atom within a molecule of interest. For example, a substituent on a ring may be a moiety such as a halogen atom, an alkyl, haloalkyl, hydroxy, cyano, or amino group, or any other substituent described herein that is covalently bonded to an atom, preferably a carbon or nitrogen atom, that is a ring member.

The term "substituted," as used herein, means that any one or more hydrogen atom(s) on the designated atom or group (e.g., alkyl, alkoxy, alkoxyalkyl, aryl, heteroaryl, aralkyl or heteroaralkyl) is replaced with a selection from the indicated substituents, provided that the designated atom's normal valence or the group's number of possible sites for substitution is not exceeded, and that the substitution results in a stable compound, i.e., a compound that can be isolated, characterized and tested for biological activity. When a substituent is oxo, i.e., =O, then 2 hydrogens on the atom are replaced. An oxo group that is a substituent of an aromatic carbon atom results in a conversion of —CH— to —C(=O)— and may lead to a loss of aromaticity. For example, a pyridyl group substituted by oxo is a pyridone. The indication mono-, di-, tri or tetrasubstituted denotes groups having one (mono), two (di), three (tri) or four substituents, provided that the substitution does not exceeded the number of possible sites for substitution and results in a stable compound. For example, a monosubstituted imidazolyl group may be an (imidazolidin-2-on)yl group and a disubstituted isoxazolyl group may be a ((3,5-dimethyl) isoxazolyl) group.

As used herein, "comprising", "including", "containing", "characterized by", and grammatical equivalents thereof are inclusive or open-ended terms that do not exclude additional, unrecited elements or method steps. Yet, "Comprising", etc. is also to be interpreted as including the more restrictive terms "consisting essentially of" and "consisting of", respectively.

As used herein, "consisting of" excludes any element, step, or ingredient not specified in the claim.

When trade names are used herein, it is intended to independently include the trade name product formulation, the generic drug, and the active pharmaceutical ingredient(s) of the trade name product.

In general, unless defined otherwise, technical and scientific terms used herein have the same meaning as commonly understood by one of ordinary skill in the art to which this invention belongs, and are consistent with general textbooks and dictionaries.

The expression alkyl or alkyl group denotes a saturated, straight-chain or branched hydrocarbon group that contains from 1 to 20 carbon atoms, preferably from 1 to 12 carbon atoms, more preferably from 1 to 6 carbon atoms, or the number of carbon atoms indicated in the prefix. If an alkyl is substituted, the substitution may take place, independently of one another, by mono-, di-, or tri-substitution of individual carbon atoms of the molecule, e.g., 1, 2, 3, 4, 5, 6, or 7 hydrogen atom(s) may, at each occasion independently, be replaced by a selection from the indicated substituents. The foregoing also applies if the alkyl group forms a part of a group, e.g., haloalkyl, hydroxyalkyl, alkylamino, alkoxy, or alkoxyalkyl. Examples of an alkyl group include methyl, ethyl, propyl, iso-propyl, n-butyl, iso-butyl, sec-butyl, tert-butyl, n-pentyl, iso-pentyl, n-hexyl, 2,2-dimethylbutyl, or n-octyl, and examples of a substituted alkyl group or a group where the alkyl forms a part of a group, include haloalkyl, e.g., a trifluoromethyl or a difluoromethyl group; hydroxyalkyl, e.g., hydroxymethyl or 2-hydroxyethyl group, and a methoxymethyl group. The term "$(C_{1-3})$alkyl" includes, for example, $H_3C-$, $H_3C-CH_2-$, $H_3C-CH_2-CH_2-$, and $H_3C-CH(CH_3)-$.

The expression alkenyl refers to an at least partially unsaturated, straight-chain or branched hydrocarbon group that contains one or more double bond(s) and from 2 to 20 carbon atoms, preferably from 2 to 12 carbon atoms, more preferably from 2 to 6 carbon atoms, for example an ethenyl(vinyl), propenyl(allyl), iso-propenyl, butenyl, isoprenyl or hex-2-enyl group. Preferably, an alkenyl group has one or two, especially one, double bond(s).

The expression alkynyl refers to an at least partially unsaturated, straight-chain or branched hydrocarbon group that contains one or more triple bond(s) and from 2 to 20 carbon atoms, preferably from 2 to 12 carbon atoms, more preferably from 2 to 6, e.g., 2, 3 or 4, carbon atoms, for example an ethynyl(acetylenyl), propynyl, butynyl or propargyl group. Preferably, an alkynyl group has one or two, especially one, triple bond(s).

The expression alkoxy or alkoxy group refers to an alkyl group singular bonded to oxygen, i.e., —O— alkyl. The term "$(C_1-C_3)$alkoxy" includes, for example, methoxy, ethoxy, n-propoxy, and isopropoxy.

The expression haloalkyl or haloalkyl group refers to an alkyl group in which one, two, three or more hydrogen atoms have been replaced independently of each other by a halogen atom. The term "$(C_1-C_3)$haloalkyl" includes, for example. fluoromethyl, difluoromethyl, trifluoromethyl, chloromethyl, dichloromethyl, bromomethyl, dibromomethyl, iodomethyl, (1- or 2-)haloethyl (e.g., (1- or 2-) fluoroethyl or (1- or 2-) chloroethyl), (2- or 3-)halopropyl (e.g. (2- or 3-) fluoropropyl or (2- or 3-) chloropropyl).

The expression hydroxyalkyl or hydroxyalkyl group refers to an alkyl group in which one, two, three or more hydrogen atoms have been replaced independently of each other by a hydroxy (OH) group. The term "$(C_1-C_3)$ hydroxyalkyl" includes, for example, hydroxymethyl, hydroxyethyl, and hydroxypropyl.

As used herein, the expression heteroalkyl or heteroalkyl group refers to an alkyl group, straight chain or branched as defined above, in which one or more, preferably 1, 2, 3 or 4, carbon atom(s) has/have been replaced, each independently of one another, by an oxygen, nitrogen, selenium, silicon or sulfur atom, preferably by an oxygen, sulfur or nitrogen atom, C(O), OC(O), C(O)O, C(O) NH, NH, SO, $SO_2$ or by a CH—CH group, wherein said heteroalkyl group may be substituted. For example, a "$(C_1-C_4)$ heteroalkyl group" contains from 1 to 4, e.g., 1, 2, 3 or 4, carbon atoms and 1, 2, 3 or 4, preferably 1, 2 or 3, heteroatoms selected from oxygen, nitrogen and sulfur (especially oxygen and nitrogen). Examples of an heteroalkyl group include alkylamino, dialkylamino, alkylaminoalkyl, dialkylaminoalkyl, acyl, acylalkyl, alkoxycarbonyl, acyloxy, acyloxyalkyl, carboxyalkylamide, alkoxycarbonyloxy, alkylcarbamoyl, alkylamido, alkylcarbamoylalkyl, alkylamidoalkyl, alkylcarbamoyloxyalkyl, alkylureidoalkyl, alkoxy, alkoxyalkyl, or alkylthio group. The expression alkylthio or alkylthio group refers to an alkyl group, in which one or more non-adjacent $CH_2$ group(s) are replaced by sulfur, wherein the alkyl moiety of the alkylthio group may be substituted. Examples of heteroalkyl groups are groups of formulae: $R^a-O-Y^a-$, $R^a-S-Y^a-$, $R^a-SO-Y^a-$, $R^a-SO_2-Y^a-$, $R^a-N(R^b)-Y^a-$, $R^a-CO-Y^a-$, $R^a-O-CO-Y^a-$, $R^a-CO-O-Y^a-$, $R^a-CO-N(R^b)-Y^a-$, $R^a-N(R^b)-CO-Y^a-$, $R^a-O-CO-N(R^b)-Y^a-$, $R^a-N(R^b)-CO-O-Y^a-$, $R^a-N(R^b)-CO-N(R^c)-Y^a-$, $R^a-O-CO-O-Y^a-$, $R^a-N(R^b)-C(=NR^d)-N(R^c)-Y^a-$, $R^a-CS-Y^a-$, $R^a-O-CS-Y^a-$, $R^a-CS-O-Y^a-$, $R^a-CS-N(R^b)-Y^a-$, $R^a-N(R^b)-CS-Y^a-$, $R^a-O-CS-N(R^b)-Y^a-$, $R^a-N(R^b)-CS-O-Y^a-$, $R^a-N(R^b)-CS-N(R^c)-Y^a-$, $R^a-O-CS-O-Y^a-$, $R^a-S-CO-Y^a-$, $R^a-CO-S-Y^a-$, $R^a-S-CO-N(R^b)-Y^a-$, $R^a-N(R^b)-CO-S-Y^a-$, $R^a-S-CO-O-Y^a-$, $R^a-O-CO-S-Y^a-$, $R^a-S-CO-S-Y^a-$, $R^a-S-CS-Y^a-$, $R^a-CS-S-Y^a-$, $R^a-S-CS-N(R^b)-Y^a-$, $R^a-N(R^b)-CS-S-Y^a-$, $R^a-S-CS-O-Y^a-$, $R^a-O-CS-S-Y^a-$, wherein $R^a$ being a hydrogen atom, a $C_1-C_6$ alkyl, a $C_2-C_6$ alkenyl or a $C_2-C_6$ alkynyl group; $R^b$ being a hydrogen atom, a $C_1-C_6$ alkyl, a $C_2-C_6$ alkenyl or a $C_2-C_6$ alkynyl group; $R^c$ being a hydrogen atom, a $C_1-C_6$ alkyl, a $C_2-C_6$ alkenyl or a $C_2-C_6$ alkynyl group; $R^d$ being a hydrogen atom, a $C_1-C_6$ alkyl, a $C_2-C_6$ alkenyl or a $C_2-C_6$ alkynyl group and Ya being a direct bond, a $C_1-C_6$ alkylene, a $C_2-C_6$ alkenylene or a $C_2-C_6$ alkynylene group, wherein each heteroalkyl group contains at least one carbon atom and one or more hydrogen atoms may be replaced by fluorine or chlorine atoms. Specific examples of a heteroalkyl group include acyl, methoxy, trifluoromethoxy, ethoxy, n-propyloxy, isopropyloxy, tert-butyloxy, methoxymethyl, ethoxymethyl, methoxyethyl, methylamino, ethylamino, dimethylamino, diethylamino, isopropylethylamino, methylaminomethyl, ethylaminomethyl, diisopropylaminoethyl, dimethylaminomethyl, dimethylaminoethyl, acetyl, propionyl, butyryloxy, acetyloxy, methoxycarbonyl, ethoxycarbonyl, isobutyrylamino-methyl, N-ethyl-N-methylcarbamoyl, N-methylcarbamoyl, cyano, nitrile, isonitrile, thiocyanate, isocyanate, isothiocyanate and alkylnitrile.

The expression cycloalkyl or cycloalkyl group refers to a saturated carbocyclic ring group comprising one or more rings (preferably 1 or 2) and containing from 3 to 14 ring carbon atoms, preferably from 3 to 10 (more preferably 3, 4, 5, 6 or 7) ring carbon atoms; the cycloalkyl group may be substituted and can be bonded as a substituent via every suitable position of the ring system. Examples of cycloalkyl include monocyclic hydrocarbon rings, bicyclic hydrocarbon rings and spiro-hydrocarbon rings. In a bicyclic cycloalkyl group, two rings are joined together so that they have at least two carbon atoms in common. In a spiro-hydrocarbon ring, 2 or 3 rings are linked together by one common atom carbon atom (spiro-atom). If a cycloalkyl is substituted, the substitution may take place, independently of one another, by mono- or di-substitution of individual ring carbon atoms of the molecule, and the cycloalkyl group as a whole may carry 1, 2, 3, or 4 substituents from the indicated selection of substituents, i.e., 1, 2, 3, or 4 hydrogen atom(s) of the carbon ring atoms may, at each occasion independently, be replaced by a substituent selected from the indicated list of substituents thereby resulting in a mono-, di-, tri-, or tetra-substituted cycloalkyl group. Examples of cycloalkyl include cyclopropyl, cyclobutyl, cyclopentyl, cyclohexyl, cycloheptyl, bicyclo[2.2.0]hexyl, bicyclo[3.2.0]heptyl, bicyclo[3.2.1]octyl, bicyclo[2.2.2]octyl, bicyclo[4.3.0]nonyl(octahydroindenyl), bicyclo[4.4.0]decyl(decahydronaphthyl), bicyclo[2.2.1]heptyl(norbornyl), bicyclo[4.1.0]heptyl(norcaranyl), bicyclo[3.1.1]heptyl(pinanyl), spiro[2.5]octyl, and spiro[3.3]heptyl. If a cycloalkyl is partially unsaturated, the group contains one, two or more double bonds, such as, for example, a cycloalkenyl group, including cyclopropenyl, cyclobutenyl, cyclopentenyl, cyclohexenyl, cycloheptenyl, cyclobutadienyl, cyclopentadienyl, cyclohexadienyl, bicyclo[2.2.1]heptadienyl, and spiro[4,5]decenyl.

The expression heterocycloalkyl or heterocycloalkyl group refers to a cycloalkyl group, saturated or partially unsaturated, as defined above, in which one or more, preferably 1, 2 or 3, ring carbon atom(s) has/have been replaced each independently of one another by an oxygen, nitrogen or sulfur atom, preferably oxygen or nitrogen, or by NO, SO or $SO_2$; the heterocycloalkyl may be substituted and can be bonded as a substituent via every suitable position of the ring system; at least one carbon atom must be present between two oxygen atoms and between two sulfur atoms or between an oxygen and a sulfur atom; and the ring as a whole must have chemical stability. A heterocycloalkyl group has preferably 1 or 2 ring(s) containing from 3 to 10 (more preferably 3, 4, 5, 6 or 7, and most preferably 5, 6 or 7) ring atoms. Examples of heterocycloalkyl include aziridinyl, oxiranyl, thiiranyl, oxaziridinyl, dioxiranyl, azetidinyl, oxetanyl, thietanyl, diazetidinyl, dioxetanyl, dithietanyl, pyrrolidinyl, tetrahydrofuranyl, thiolanyl, azolyl, thiazolyl, isothiazolyl, imidazolidinyl, pyrazolidinyl, oxazolidinyl, isoxazolidinyl, thiazolidinyl, isothiazolidinyl, dioxolanyl, dithiolanyl, piperazinyl, morpholinyl, thiomorpholinyl, trioxanyl, azepanyl, oxepanyl, thiepanyl, homopiperazinyl, urotropinyl, oxazolidinonyl, dihydropyrazolyl, dihydropyrrolyl, dihydropyrazinyl, dihydropyridyl, dihydropyrimidinyl, dihydrofuryl, dihydropyranyl, and examples of substituted heterocycloalkyl include lactam, lactone and cyclic imide ring systems.

The expressions aryl, Ar or aryl group refer to an aromatic group that contains one or more aromatic rings containing from 6 to 14 ring carbon atoms ($C_6$-$C_{14}$), preferably from 6 to 10 ($C_6$-$C_{10}$), more preferably 6 ring carbon atoms; the aryl may be substituted and can be bonded as a substituent via every suitable position of the ring system. Examples of aryl include phenyl, naphthyl, bi-phenyl, indanyl, indenyl, anthracenyl, phenanthrenyl, tetrahydronaphthyl and fluorenyl.

The expression heteroaryl or heteroaryl group refers to an aromatic group that contains one or more aromatic rings containing from 5 to 14 ring atoms, preferably from 5 to 10 (more preferably or 6) ring atoms, and contains one or more (preferably 1, 2, 3 or 4) oxygen, nitrogen, phosphorus or sulfur ring atoms (preferably O, S or N); the heteroaryl may be substituted and can be bonded as a substituent via every suitable position of the ring system. Examples of an unsubstituted heteroaryl group include 2-pyridyl, 2-imidazolyl, 3-phenylpyrrolyl, thiazolyl, oxazolyl, triazolyl, tetrazolyl, isoxazolyl, indazolyl, indolyl, benzimidazolyl, pyridazinyl, quinolinyl, purinyl, carbazolyl, acridinyl, pyrimidyl, 2,3'-bifuryl, 3-pyrazolyl and isoquinolinyl.

The expression aralkyl refers to a group containing both aryl and also alkyl, alkenyl, alkynyl and/or cycloalkyl groups in accordance with the above definitions, such as, for example, arylalkyl, arylalkenyl, arylalkynyl, arylcycloalkyl, arylcycloalkenyl, alkylarylcycloalkyl and alkylarylcycloalkenyl groups. Specific examples of aralkyls are toluene, xylene, mesitylene, styrene, benzyl chloride, o-fluorotoluene, 1H-indene, tetralin, dihydronaphthalene, indanone, phenylcyclopentyl, cumene, cyclohexylphenyl, fluorene and indan. An aralkyl group preferably contains one or two aromatic ring systems (1 or 2 rings) containing from 6 to 10 carbon atoms and one or two alkyl, alkenyl and/or alkynyl groups containing from 1 or 2 to 6 carbon atoms and/or a cycloalkyl group containing 5 or 6 ring carbon atoms.

The expression heteroaralkyl refers to an aralkyl group as defined above in which one or more (preferably 1, 2, 3 or 4) carbon atoms have been replaced each independently of the others by an oxygen, nitrogen, silicon, selenium, phosphorus, boron or sulfur atom (preferably oxygen, sulfur or nitrogen), that is to say to groups containing both aryl or heteroaryl and also alkyl, alkenyl, alkynyl and/or heteroalkyl, and/or cycloalkyl, and/or heterocycloalkyl groups in accordance with the above definitions. A heteroaralkyl group preferably contains one or two aromatic ring systems (1 or 2 rings) containing from 5 or 6 to 10 ring carbon atoms and one or two alkyl, alkenyl and/or alkynyl groups containing 1 or 2 to 6 carbon atoms and/or a cycloalkyl group containing 5 or 6 ring carbon atoms, 1, 2, 3 or 4 of those carbon atoms having been replaced each independently of the others by oxygen, sulfur or nitrogen atoms. Examples of heteroaralkyl groups are arylheteroalkyl, arylheterocycloalkyl, arylheterocycloalkenyl, arylalkylheterocycloalkyl, arylalkenylheterocycloalkyl, arylalkynyl heterocycloalkyl, arylalkylheterocycloalkenyl, heteroarylalkyl, heteroarylalkenyl, heteroarylalkynyl, heteroarylheteroalkyl, heteroarylcycloalkyl, heteroarylcycloalkenyl, heteroarylheterocycloalkyl, heteroarylheterocycloalkenyl, heteroaryl-alkylcycloalkyl, heteroarylalkylheterocycloalkenyl, heteroarylheteroalkylcycloalkyl, heteroaryl-heteroalkylcycloalkenyl, heteroalkylheteroarylalkyl and heteroarylheteroalkylheterocycloalkyl groups, the cyclic groups being saturated or mono-, di- or tri-unsaturated. Specific examples are a tetrahydroisoquinolinyl, benzoyl, 2- or 3-ethylindolyl, 4-methylpyridino, 2-, 3- or 4-methoxyphenyl, 4-ethoxyphenyl, 2-, 3- or 4-carboxyphenylalkyl group.

The general term ring as used herein, unless defined otherwise, includes the cyclic groups defined herein above, e.g., an aryl group, heteroaryl group, aralkyl group and heteroaralkyl group.

The expression halogen or halogen atom as used herein means fluorine, chlorine, bromine, or iodine, among which fluorine and chlorine are preferred.

The expression heteroatom as used herein, preferably denotes an oxygen, nitrogen or sulfur atom, more preferably a nitrogen or oxygen atom unless specified otherwise.

The expression "alkylene" (or alkanediyl functional group) refers to an unsubstituted, saturated, straight chain hydrocarbon group that contains the indicated number of carbon atoms (in the form of methylene ($CH_2$) groups) and has the free valencies at the terminal methylene groups, for example a butylene —$(CH_2)_4$—, n-pentylene-$(CH_2)_5$—, n-hexylene-$(CH_2)_6$—, or n-octylene—$(CH_2)_8$-group.

The term "PqsR inverse agonist", as used herein, refers to a compound of general formula (I) provided herein, as well as to salts and preferably pharmaceutically acceptable salts thereof. It will be apparent that such compounds may be further substituted as indicated.

The activity and more specifically the bioactivity of the compounds according to the present invention can be assessed using appropriate assays known to those skilled in the art, e.g., in vitro or in vivo assays. For instance, the PqsR inverse agonistic activity may be determined by *E. coli*- based β-galactosidase reporter gene assay, or evaluated in a pyocyanin assay as provided in more detail in the Examples below.

Preferably, the present invention relates to one or more of the following:

[2] the compound according to [1] above, or a pharmacologically acceptable salt thereof, wherein $X^1$ is CH;

[3] the compound according to [1], or a pharmacologically acceptable salt thereof, wherein $X^1$ is N;

[4] the compound according to any one of [1] to [3], or a pharmacologically acceptable salt thereof, wherein the compound is selected from

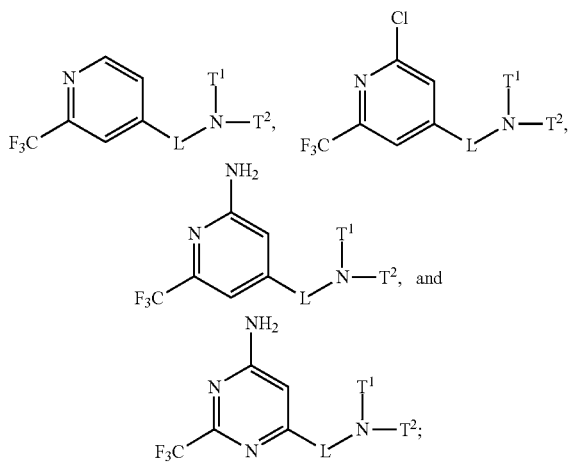

wherein L, $T^1$ and $T^2$ are defined as in [1] above;

[5] the compound according to any one of [1] to [4], or a pharmacologically acceptable salt thereof, wherein L is a group of formula (L-1);

[6] the compound according to [5], or a pharmacologically acceptable salt thereof, wherein $R^{L1}$ represents a hydrogen atom;

[7] the compound according to [5] or [6], or a pharmacologically acceptable salt thereof, wherein $X^1$ is CH; and $R^4$ represents a hydrogen atom or Cl;

[8] the compound according to any one of [5] to [7], or a pharmacologically acceptable salt thereof, wherein $T^1$ is hydrogen atom; and $T^2$ is a 6-membered aryl or heteroaryl group, which group may be substituted by one, two or more, identical or different, group(s) selected from: a halogen atom, OH, =O, $NH_2$, $(C_1$-$C_3)$alkyl which may be substituted by one or more, identical or different, group(s) selected from a halogen atom, OH, =O, and $NH_2$; $(C_1$-$C_3)$alkoxy which may be substituted by one or more, identical or different, group(s) selected from a halogen atom, OH, =O, and $NH_2$; and $C(O)NR^{T1}R^{T2}$;

$R^{T1}$ and $R^{T2}$ each, independently of one another, represents a hydrogen atom or a $(C_1$-$C_3)$alkyl group, which may be substituted by one or more, identical or different, group(s) selected from a halogen atom, OH, =O, and $NH_2$;

[9] the compound according to any one of [1] to [4], or a pharmacologically acceptable salt thereof, wherein L is a group of formula (L-2);

[10] the compound according to [9], or a pharmacologically acceptable salt thereof, wherein $R^{L2}$ represents a hydrogen atom or Cl;

[11] the compound according to [9] or [10], or a pharmacologically acceptable salt thereof, wherein $X^1$ is CH; and $R^4$ represents Cl;

[12] the compound according to any one of [9] to [11], or a pharmacologically acceptable salt thereof, wherein $T^1$ and $T^2$ both represent O;

[13] the compound according to any one of [9] to [11], or a pharmacologically acceptable salt thereof, wherein $T^1$ is a hydrogen atom; and $T^2$ represents a hydrogen atom; or a 6-membered aryl or heteroaryl group, which group may be substituted by one, two or more, identical or different, group(s) selected from: a halogen atom, OH, =O, $NH_2$, $(C_1$-$C_3)$alkyl which may be substituted by one or more, identical or different, group(s) selected from a halogen atom, OH, =O, and $NH_2$; $(C_1$-$C_3)$alkoxy which may be substituted by one or more, identical or different, group(s) selected from a halogen atom, OH, =O, and $NH_2$; and $C(O)NR^{T1}R^{T2}$;

$R^{T1}$ and $R^{T2}$ each, independently of one another, represents a hydrogen atom or a $(C_1$-$C_3)$alkyl group, which may be substituted by one or more, identical or different, group(s) selected from a halogen atom, OH, =O, and $NH_2$;

[14] the compound according to any one of [1] to [4], or a pharmacologically acceptable salt thereof, wherein L is a group of formula (L-3);

[15] the compound according to [14], or a pharmacologically acceptable salt thereof, wherein $Y^1$ represents S;

[16] the compound according to [14], or a pharmacologically acceptable salt thereof, wherein $Y^1$ represents O;

[17] the compound according to [14], or a pharmacologically acceptable salt thereof, wherein $Y^1$ represents NH;

[18] the compound according to any one [14] of to [17], or a pharmacologically acceptable salt thereof, wherein $R^4$ represents a hydrogen atom or $NH_2$;

[19] the compound according to any one of [14] to [18], or a pharmacologically acceptable salt thereof, wherein $X^1$ is CH;

[20] the compound according to any one of [14] to [19], or a pharmacologically acceptable salt thereof, wherein the group represented by formula (L-3) contains one of the following groups as a partial structure:

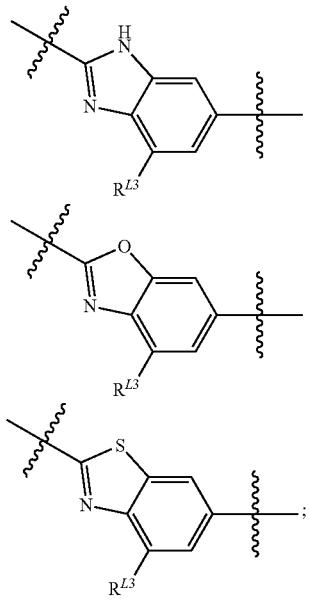

[21] the compound according to any one of [14], [15] and [18] to [20], or a pharmacologically acceptable salt thereof, wherein the group represented by formula (L-3) is a group:

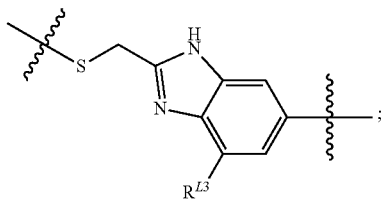

[22] the compound according to any one of [14] to [21], or a pharmacologically acceptable salt thereof, wherein $R^{L3}$ represents a hydrogen atom, F or $CH_3$;

[23] the compound according to any one of [14] to [22], or a pharmacologically acceptable salt thereof, wherein $T^1$ is a hydrogen atom; and $T^2$ represents a 6-membered aryl or heteroaryl group, which group may be substituted by one, two or more, identical or different, group(s) selected from: a halogen atom, OH, =O, $NH_2$, $(C_1-C_3)$alkyl which may be substituted by one or more, identical or different, group(s) selected from a halogen atom, OH, =O, and $NH_2$; $(C_1-C_3)$ alkoxy which may be substituted by one or more, identical or different, group(s) selected from a halogen atom, OH, =O, and $NH_2$; and $C(O)NR^{T1}R^{T2}$;

$R^{T1}$ and $R^{T2}$ each, independently of one another, represents a hydrogen atom or a $(C_1-C_3)$alkyl group, which may be substituted by one or more, identical or different, group(s) selected from a halogen atom, OH, =O, and $NH_2$;

[24] the compound according to any one of [1] to [8] and [14] to [23], or a pharmacologically acceptable salt thereof, wherein the group $NT^1T^2$ is selected from the groups:

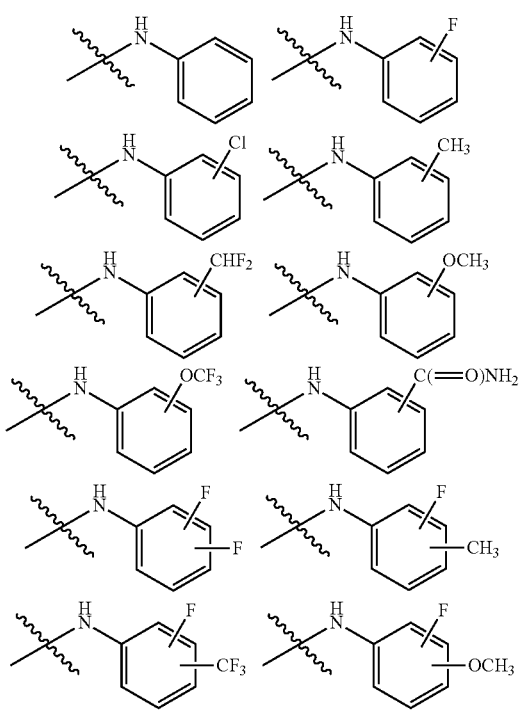

[25] the compound according to any one of [1] to [24], or a pharmacologically acceptable salt thereof, wherein the compound is selected from the group consisting of:

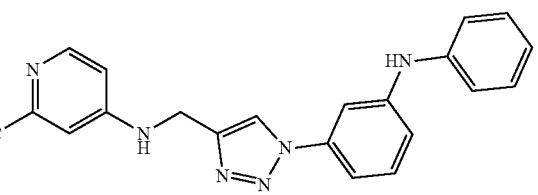

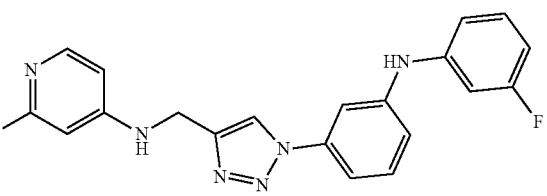

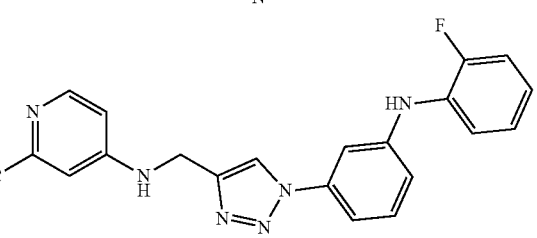

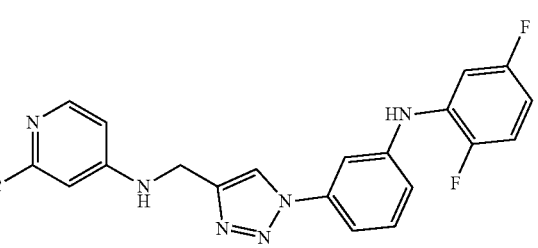

-continued

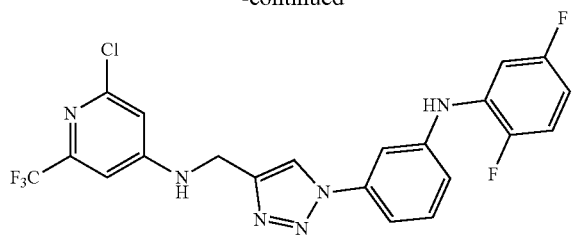

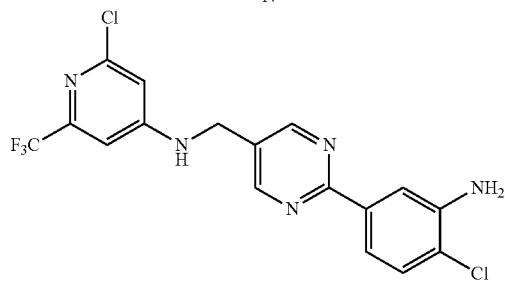

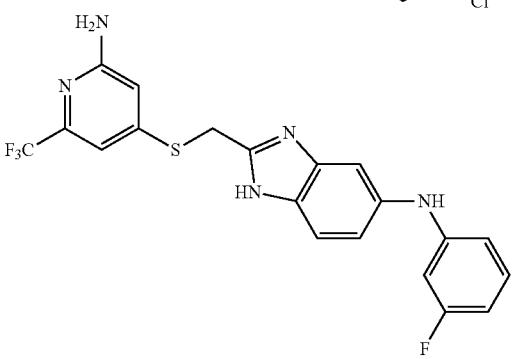

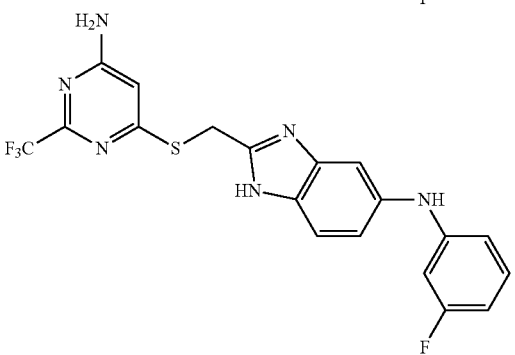

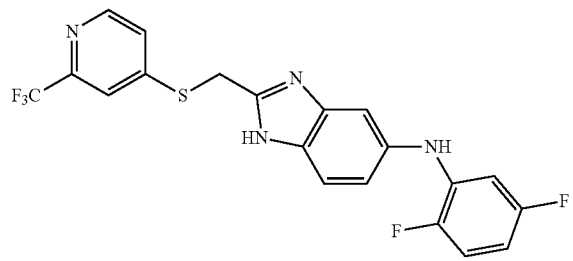

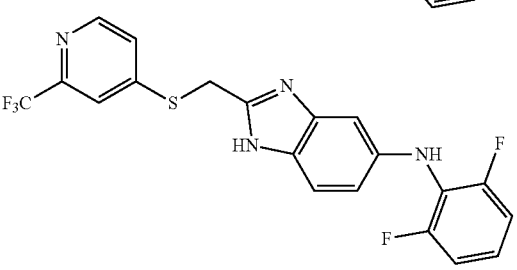

-continued

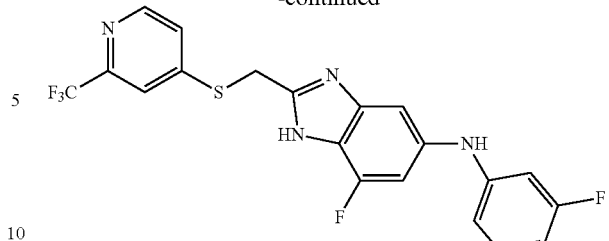

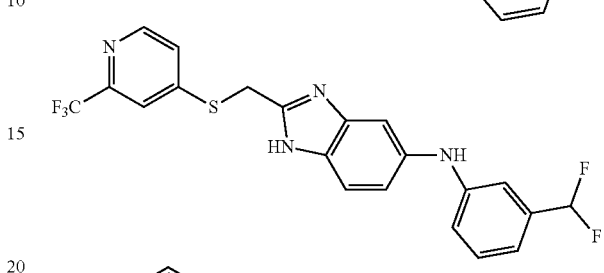

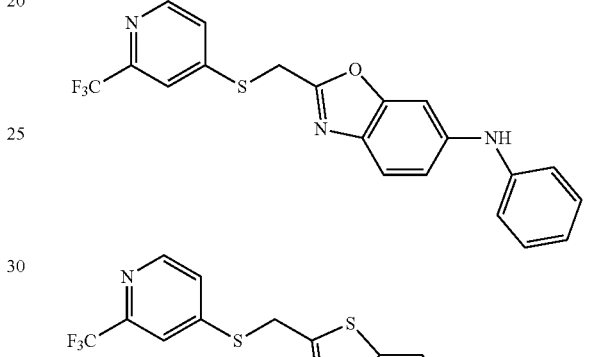

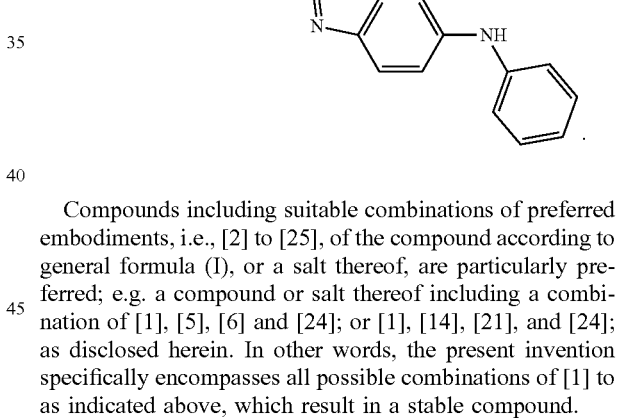

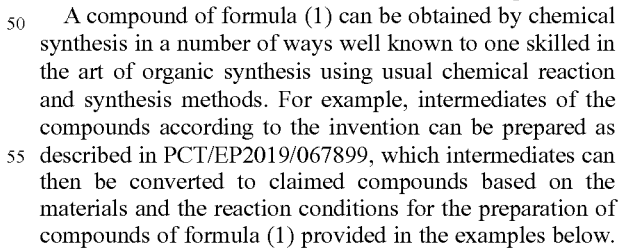

Compounds including suitable combinations of preferred embodiments, i.e., [2] to [25], of the compound according to general formula (I), or a salt thereof, are particularly preferred; e.g. a compound or salt thereof including a combination of [1], [5], [6] and [24]; or [1], [14], [21], and [24]; as disclosed herein. In other words, the present invention specifically encompasses all possible combinations of [1] to as indicated above, which result in a stable compound.

A compound of formula (1) can be obtained by chemical synthesis in a number of ways well known to one skilled in the art of organic synthesis using usual chemical reaction and synthesis methods. For example, intermediates of the compounds according to the invention can be prepared as described in PCT/EP2019/067899, which intermediates can then be converted to claimed compounds based on the materials and the reaction conditions for the preparation of compounds of formula (1) provided in the examples below.

The therapeutic use of a compound of formula (I), its pharmacologically acceptable salts, solvates or hydrates and also formulations and pharmaceutical compositions which contain the same are within the scope of the present invention. Accordingly, the present invention relates to a compound or a pharmaceutical composition of the invention for use as a medicament. The present invention also relates to the use of those compounds of formula (I) as active ingredients in the preparation or manufacture of a medicament.

A pharmaceutical composition according to the present invention comprises at least one compound of formula (I) and, optionally, one or more carrier substance(s), excipient (s) and/or adjuvant(s). Pharmaceutical compositions may additionally comprise, for example, one or more of water, buffers (e.g., neutral buffered saline or phosphate buffered saline), ethanol, mineral oil, vegetable oil, dimethylsulfoxide, carbohydrates (e.g., glucose, mannose, sucrose or dextrans), mannitol, proteins, adjuvants, polypeptides or amino acids such as glycine, antioxidants, chelating agents such as EDTA or glutathione and/or preservatives. Furthermore, one or more other active ingredients may (but need not) be included in the pharmaceutical compositions provided herein. For instance, the compounds of the invention may advantageously be employed in combination with another antibiotic or antifungal agent, an anti-viral agent, an antihistamine, a non-steroidal anti-inflammatory drug, a disease modifying anti-rheumatic drug, another cytostatic drug, a drug with smooth muscle activity modulatory activity or mixtures of the aforementioned.

Pharmaceutical compositions may be formulated for any appropriate route of administration, including, for example, topical such as, e.g., transdermal or ocular, oral, buccal, nasal, vaginal, rectal or parenteral administration. The term parenteral as used herein includes subcutaneous, intradermal, intravascular such as, e.g., intravenous, intramuscular, spinal, intracranial, intrathecal, intraocular, periocular, intraorbital, intrasynovial and intraperitoneal injection, as well as any similar injection or infusion technique. Within the invention, compositions provided herein may be formulated as a lyophilizate. Formulation for topical administration may be preferred for certain conditions such as, e.g., in the treatment of skin conditions such as burns or itch.

Carrier substances are, for example, cyclodextrins such as hydroxypropyl B-cyclodextrin, micelles, liposomes, nanoparticles such as solid-lipid nanoparticles, excipients and/or adjuvants. Customary excipients include, for example, inert diluents such as, e.g., calcium carbonate, sodium carbonate, lactose, calcium phosphate or sodium phosphate, granulating and disintegrating agents such as, e.g., corn starch or alginic acid, binding agents such as, e.g., starch, gelatin or acacia, and lubricating agents such as, e.g., magnesium stearate or stearic acid. Examples of adjuvants are aluminum hydroxide, aluminum phosphate, calcium phosphate hydroxide, paraffin oil, squalene, thimerosal, detergents, Freund's complete adjuvant, or Freund's incomplete adjuvant.

For the prevention and/or treatment of bacterial infections, especially *P. aeruginosa* or *Burkholderia* infections, the dose of the biologically active compound according to the invention may vary within wide limits and may be adjusted to individual requirements. Active compounds according to the present invention are generally administered in a therapeutically effective amount. The expression "therapeutically effective amount" denotes a quantity of the compound(s) that produces a result that in and of itself helps to ameliorate, heal, or cure the respective condition or disease. Preferred doses range from about 0.1 mg to about 140 mg per kilogram of body weight per day (about 0.5 mg to about 7 g per patient per day). The daily dose may be administered as a single dose or in a plurality of doses. The amount of active ingredient that may be combined with the carrier materials to produce a single dosage form will vary depending upon the host treated and the particular mode of administration. Dosage unit forms will generally contain between from about 1 mg to about 500 mg of an active ingredient.

It will be understood, however, that the specific dose level for any particular patient will depend upon a variety of factors including the activity of the specific compound employed, the age, body weight, general health, sex, diet, time of administration, route of administration, and rate of excretion, drug combination (i.e., other drugs being used to treat the patient) and the severity of the particular disease undergoing therapy.

The invention further relates to a combination preparation containing at least one compound according to the invention and at least one further active pharmaceutical ingredient. The combination preparation of the invention for use as a medicament, in particular for use in the treatment or prophylaxis of bacterial infections, such as a *P. aeruginosa* or *Burkholderia* infection.

Preferably, in the combination preparation of the invention the further active pharmaceutical ingredient is another antibiotic, including classical antibiotics and anti-virulence compounds such as quorum sensing and adhesion inhibitors. The other antibiotic can be selected from the group consisting of (a) B-lactam antibiotics, including penams, carbapenams, oxapenams, penems, carbapenems, monobactams, cephems, carbacephems, oxacephems, and monobactams; (b)aminoglycoside antibiotics, including Amikacin, Arbekacin, Astromicin, Bekanamycin, Dibekacin, Framycetin, Gentamicin, Hygromycin B, Isepamicin, Kanamycin, Neomycin, Netilmicin, Paromomycin, Paromomycin sulfate, Ribostamycin, Sisomicin, Spectinomycin, Streptomycin, Tobramycin, and Verdamicin; (c) quinolone antibiotics, including Ciprofloxacin, Enoxacin, Gatifloxacin, Grepafloxacin, Levofloxacin, Lomefloxacin, Moxifloxacin, Nalidixic acid, Norfloxacin, Ofloxacin, Sparfloxacin, Temafloxacin, and Trovafloxacin; and (d) cationic peptidic antibiotics, including Polymyxins (e.g., Collistin), LL-37, and POL7080.

Preferred compounds of the invention will have certain pharmacological properties. Such properties include, but are not limited to oral bioavailability, such that the preferred oral dosage forms discussed above can provide therapeutically effective levels of the compound in vivo.

The compound according to the invention as well as the pharmaceutical composition and the combination preparation according to the invention can be used as a medicament, which can be administered to a patient (e.g., parenterally to a human or another mammal), and will be present within at least one body fluid or tissue of the patient. As used herein, the term "treatment" encompasses both disease-modifying treatment and symptomatic treatment, either of which may be prophylactic, i.e., before the onset of symptoms, in order to prevent, delay or reduce the severity of symptoms, or therapeutic, i.e., after the onset of symptoms, in order to reduce the severity and/or duration of symptoms. In particular, the conditions or diseases that can be ameliorated, prevented or treated using a compound of formula (I) or a pharmaceutical composition according to the invention include bacterial infections, in particular antimicrobial activity against Gram-negative bacteria, especially infections with *Pseudomonas aeruginosa* strains (such as PAO1, PA14. MHH9639, MHH11444, and further clinical isolates exhibiting an intact pqs QS system) including such of the urinary tract, of the gastrointestinal tract, of chronic and burnt wounds, of the eyes, of the ears, and of the lungs or infections with *Burkholderia* species (such as *B. cenocepacia* and *B. pseudomallei*). Accordingly, the present invention also provides methods for treating a subject, e.g. patients, suffering from said diseases. Patients may include but are not limited to primates (especially humans), domesticated companion animals (such as dogs, cats, horses) and livestock (such as cattle, pigs, sheep, chicken), with dosages as described herein.

The present invention also enables prophylaxis or treatment of a respiratory condition, including cystic fibrosis (CF), non-cystic-fibrosis bronchiectasis (NCFB), chronic obstructive pulmonary disease (COPD) and primary ciliary dyskinesia. That is to say, the present invention also includes a method for preventing or treating a respiratory condition, including cystic fibrosis (CF), non-cystic-fibrosis bronchiectasis (NCFB), chronic obstructive pulmonary disease (COPD) and primary ciliary dyskinesia, in a subject, the method comprising:

administering to said subject an effective amount of the compound (i.e., a compound according to any one of [1] to [25]), of the pharmaceutical composition, or of the combination preparation according to the present invention, thereby treating the respiratory condition.

The invention further relates to a coating for medicinal devices, e.g., catheters, implants, or tubings, containing at least one compound according to the present invention.

The present invention is now further illustrated by the following examples from which further features, embodiments and advantages of the present invention may be taken. However, the invention should not be construed to be limited to the examples, but encompasses the subject-matter as defined in the claims.

EXAMPLES

Materials and Methods

A. Chemicals and Analytical Methods Used for Organic Synthesis $^1$H and $^{13}$C NMR spectra were recorded on a Bruker DRX-500 instrument. Chemical shifts are given in parts per million (ppm) with the solvent resonance as internal standard for spectra obtained in CDCl$_3$, MeOH-d$_4$ and DMSO-d$_6$. All coupling constants (J) are given in Hertz. Mass spectrometry (LC/MS) was performed on a MSQ® electro spray mass spectrometer (Thermo Fisher). The system was operated by the standard software Xcalibur®. A RP C18 NUCLEODUR® 100-5 (125×3 mm) column (Macherey-Nagel GmbH) was used as stationary phase with water/acetonitrile mixtures as eluent. All solvents were HPLC grade. Reagents were used as obtained from commercial suppliers without further purification. Flash chromatography was performed on silica gel 60, 70-230 mesh (Fluka) and the reaction progress was determined by thin-layer chromatography (TLC) analyses on silica gel 60, F254 (Merck). Visualization was accomplished with UV light and staining with basic potassium permanganate (KMnO$_4$). The melting points were measured using melting point apparatus SMP3 (Stuart Scientific). The apparatus is uncorrected.

Specific examples for the preparation of compounds of formula (I) are provided in the following examples, wherein reactants can, for example, be prepared as described in PCT/EP2019/067899. Unless otherwise specified all starting materials and reagents are of standard commercial grade, and are used without further purification, or are readily prepared from such materials by routine methods. Those skilled in the art of organic synthesis will recognize that starting materials and reaction conditions may be varied including additional steps employed to produce compounds encompassed by the present invention.

B. Chemicals, Bacterial Strains and Media Used in Biological Experiments.

Yeast extract was purchased from Fluka (Neu-Ulm, Germany), peptone from casein from Merck (Darmstadt, Germany), and Bacto™ Tryptone from BD Biosciences (Heidelberg, Germany). Salts and organic solvents of analytical grade were obtained from VWR (Darmstadt, Germany).

*P. aeruginosa* strain PA14 (PA14) was stored in glycerol stocks at −80° C.

The following media were used: Luria Bertani broth (LB) and PPGAS medium [23].

Example 1. Compounds 01 to 07

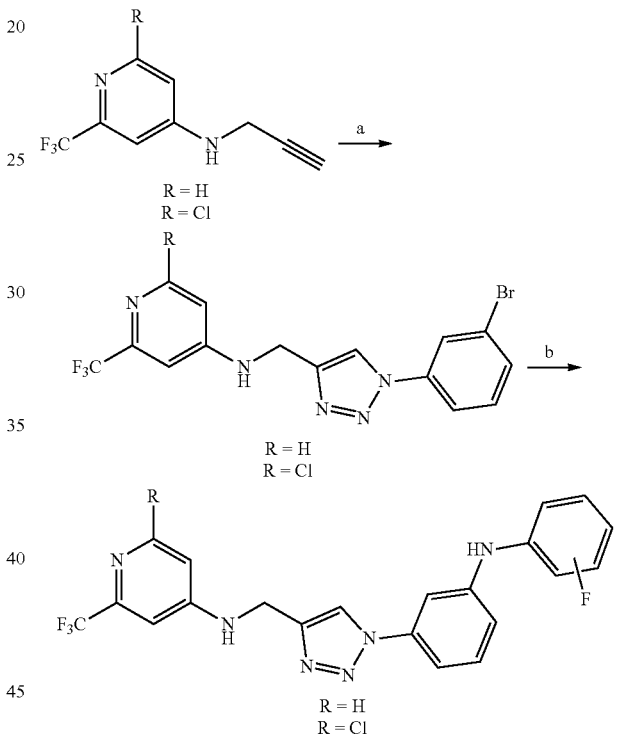

Preparation of triazole-containing compounds 01 to 07

Scheme: a: 1-azido-3-bromobenzene, CuSO$_4$*5 H$_2$O, sodium ascorbate, DIPEA, MeCN, 2 h, rt; b: Cs$_2$CO$_3$, Pd-175, 1,4-dioxane, 16 h, 90° C.

Step a: 1-Azido-3-bromobenzene (1.0 Eq.), the corresponding alkyne (1.0 Eq.) and DIPEA (1.0 Eq.) were dissolved in MeCN (5 mL/mmol) and purged with argon. After adding CuSO$_4$*5 H$_2$O (10 mol %) and sodium ascorbate (20 mol %) the reaction mixture was purged with argon again and stirred at room temperature for 2 hours. Saturated NH$_4$Cl solution and EtOAc were added and stirred for 10 minutes. The phases were separated and the aqueous phase was extracted twice with EtOAc. The combined organic phases were washed with saturated EDTA solution and filtered over MgSO$_4$. The crude product was used in the next step without further purification.

Step b: A crimp vial was charged with N-((1-(3-bromophenyl)-1H-1,2,3-triazol-4-yl)methyl)-2-(trifluoromethyl) pyridin-4-amine (1.0 Eq.), the corresponding aniline (1.0 Eq.) and Cs$_2$CO$_3$ (1.1 Eq.). 1,4-dioxane (10 mL/mmol) was added and the reaction mixture was purged with argon for 5 minutes. After addition of Pd-175 (5 mol %) the mixture was purged with argon for further 5 minutes and the vial was heated at 90° C. After stirring for 16 hours the reaction mixture was filtered and subjected to automated flash chromatography which yielded the desired product.

N-((1-(4-((2-Fluorophenyl)amino)phenyl)-1H-1,2,3-triazol-4-yl)methyl)-2-(trifluoromethyl)pyridin-4-amine (01)

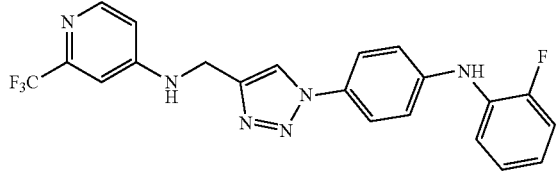

LC-MS: m/z: 429 (M+H)⁺. ¹H-NMR (500 MHZ, CDCl₃): δ [ppm]=4.62 (d, J=5.5 Hz, 2H), 5.25 (bs, 1H), 5.95 (s, 1H), 6.70 (dd, J=5.8 Hz, J=2.3 Hz, 1H), 6.94 (d, J=2.3 Hz, 1H), 6.96-7.00 (m, 1H), 7.10 (dd, J=7.6 Hz, 1H), 7.14-7.17 (m, 1H), 7.17-7.20 (m, 2H), 7.36 (ddd, J=8.3 Hz, J=1.5 Hz, 1H), 7.58-7.61 (m, 1H), 7.85 (s, 1H) 8.33 (d, J=5.7 Hz, 1H).

N-((1-(3-(Phenylamino)phenyl)-1H-1,2,3-triazol-4-yl)methyl)-2-(trifluoromethyl)pyridin-4-amine (02)

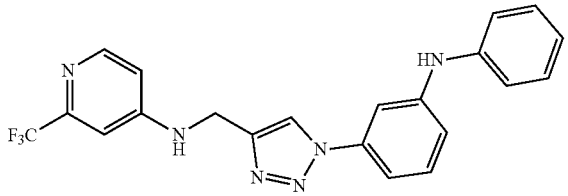

LC-MS: m/z: 411 (M+H)+. ¹H-NMR (500 MHz, CDCl₃): δ [ppm]=4.58 (d, J=5.3 Hz, 2H), 5.36 (s, 1H), 6.03 (s, 1H), 6.66 (dd, J=5.7 Hz, J=2.1 Hz, 1H), 6.91 (d, J=2.3 Hz, 1H), 7.05 (dd, J=7.3 Hz, 1H), 7.09 (dd, J=8.1 Hz, J=2.1 Hz, 1H), 7.11 (dd, J=7.9 Hz, J=1.8 Hz, 1 H), 7.15 (d, J=8.2 Hz, 2H), 7.31-7.37 (m, 3H), 7.42-7.43 (m, 1H), 7.88 (s, 1H), 8.31 (d, J=5.7 Hz, 1H).

N-((1-(3-((2-Fluorophenyl)amino)phenyl)-1H-1,2,3-triazol-4-yl)methyl)-2-(trifluoromethyl)pyridin-4-amine (03)

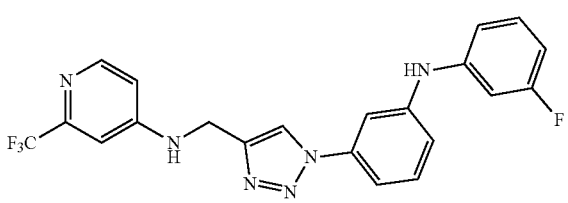

LC-MS: m/z: 429 (M+H)⁺. 1H-NMR (500 MHZ, CDCl₃): δ [ppm]=4.64 (d, J=5.7 Hz, 2H), 6.80 (bs, 1H), 6.88 (J=5.7 Hz, J=2.3 Hz, 1H), 7.04-7.07 (m, 1H), 7.13 (d, J=2.3 Hz, 1 H), 7.14-7.17 (m, 2H), 7.18-7.22 (m, 1H), 7.30 (dd, J=8.9 Hz, J=2.0 Hz, 1H), 7.43 (dd, J=8.1 Hz, 1H), 7.46-7.48 (m, 1H), 7.57-7.60 (m, 2H), 8.32 (d, J=5.7 Hz, 1H), 8.49 (s, 1H).

N-((1-(3-((3-Fluorophenyl)amino)phenyl)-1H-1,2,3-triazol-4-yl)methyl)-2-(trifluoromethyl)pyridin-4-amine (04)

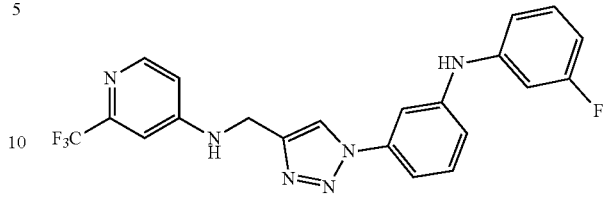

LC-MS: m/z: 429 (M+H)⁺. ¹H-NMR (500 MHz, CDCl₃): δ [ppm]=4.64 (d, J=5.8 Hz, 2H), 6.66 (dd, J=8.2 Hz, J=2.4 Hz, 1H), 6.81 (bs, 1 H), 6.68 (dd, J=5.8 Hz, J=2.4 Hz, 1H), 7.01 (dd, J=8.2 Hz, J=1.4 Hz, 1 H), 7.12 (d, J=2.3 Hz, 1H), 7.23 (dd, J=8.1 Hz, J=2.3 Hz, 1H), 7.29-7.33 (m, 1H), 7.33-7.35 (m, 1H), 7.46 (dd, J=8.1 Hz, 1H), 7.66 (dd, J=2.0 Hz, 1H), 8.01 (bs, 1H), 8.21 (d, J=5.8 Hz, 1H), 8.52 (s, 1H).

N-((1-(3-((4-Fluorophenyl)amino)phenyl)-1H-1,2,3-triazol-4-yl)methyl)-2-(trifluoromethyl)-pyridin-4-amine (05)

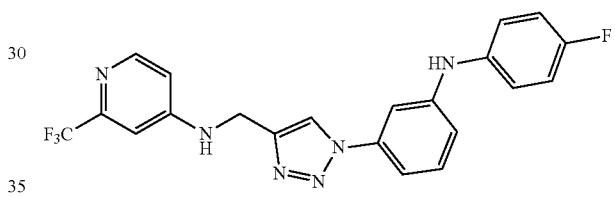

LC-MS: m/z: 429 (M+H)+. ¹H-NMR (500 MHZ, CDCl₃): δ [ppm]=4.59 (bs, 2H), 5.27 (bs, 1H), 5.88 (s, 1H), 6.66 (s, 1H), 6.90-6.99 (m, 2H), 7.03-7.08 (m, 1H), 7.13-7.15 (m, 3H), 7.25-7.27 (m, 1H), 7.32-7.36 (m, 2H), 7.87 (d, J=4.7 Hz, 1H), 8.30-8.32 (m, 1H).

N-((1-(3-((2,5-Difluorophenyl)aminoe)phenyl)-1H-1,2,3-triazol-4-yl)methyl)-2-(trifluoromethyl)pyridin-4-amine (06)

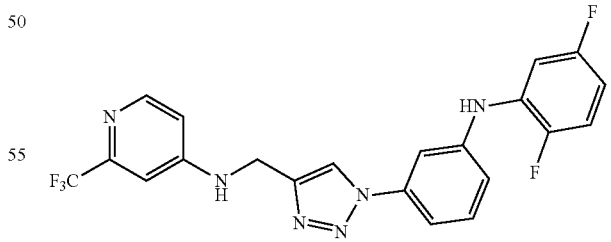

LC-MS: m/z: 447 (M+H)⁺. ¹H-NMR (500 MHZ, CDCl₃): δ [ppm]=4.63 (d, J 5.5 Hz, 2H), 5.26 (bs, 1H), 6.07 (s, 1H), 6.85-6.63 (m, 1H), 6.69 (dd, J=5.7, J=2.3 Hz, 1H), 6.94 (d, J=2.3 Hz, 1H), 7.04-7.07 (m, 1H), 7.08-7.10 (m, 1H), 7.20 (ddd, J=8.2 Hz, J=2.3 Hz, J=0.8 Hz, 1H), 7.28 (dd, J=2.1 Hz, J=0.9 Hz, 1H), 7.46 (dd, J=8.1 Hz, 1H), 7.53 (dd, J=2.1 Hz, 1H), 7.92 (s, 1H), 8.33 (d, J=5.8 Hz, 1H).

2-Chloro-N-((1-(3-((2,5-difluorophenyl)amino)phenyl)-1H-1,2,3-triazol-4-yl)methyl)-6-(trifluoromethyl)pyridin-4-amine (07)

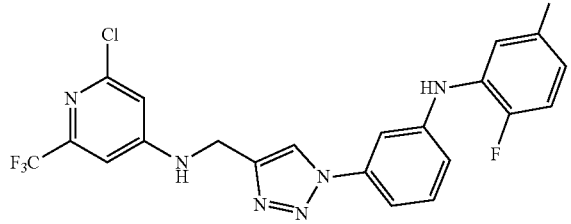

LC-MS: m/z: 481 (M+H)+. 1H-NMR (500 MHZ, DMSO-d$_6$): δ [ppm]=4.60 (d, J=5.7 Hz, 2 H), 6.01 (d, J=1.7 Hz, 1H), 6.68 (m, 3H), 7.16-7.22 (m, 2H), 7.26 (d, J=8.1 Hz, J=2.4 Hz, 1H), 7.42 (ddd, J=7.9 Hz, J=2.0 Hz, J=0.9 Hz, 1H), 7.49 (dd, J=8.1 Hz, 1H), 7.69 (dd, J=2.0 Hz, 1H), 7.76 (bs, 1H), 8.53 (s, 1H).

Example 2. Compounds 08 to 11

Preparation of pyrimidine-containing compounds 08 to 11.

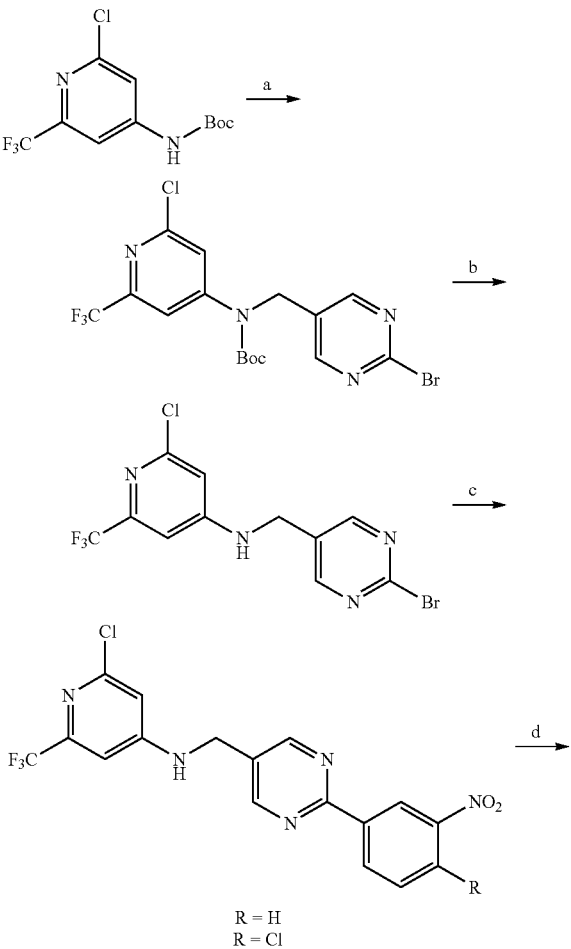

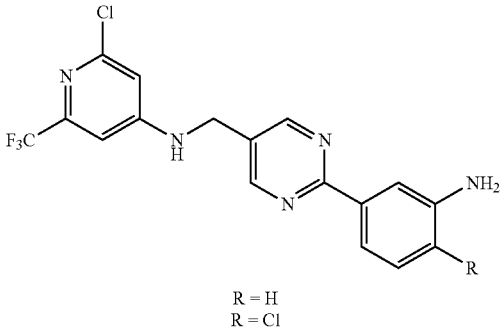

R = H
R = Cl

Step a: To a stirred solution of tert-butyl (2-(trifluoromethyl)pyridin-4-yl) carbamate (1.0 Eq.) and NaH (2.0 Eq.) in DMF (100 mL/mmol) at 0° C. was added 2-bromo-5-(bromomethyl)pyrimidine (1.0 Eq.). The reaction was stirred at room temperature overnight. The reaction was then added to ice water followed by extraction with ethyl acetate. The organic phase was then dried over MgSO$_4$, filtered and evaporated under reduced pressure. Purification was done by automated column chromatography to give the desired product.

Step b: tert-butyl ((2-bromopyrimidin-5-yl)methyl) (2-chloro-6-(trifluoromethyl)pyridin-4-yl) carbamate (1.0 Eq.) was dissolved in DCM (72 mL/mmol) and TFA (14 mL/mmol) was added. After stirring at r.t. for 18 h the mixture was cooled to 0° C. and saturated Na$_2$CO$_3$ solution was added. The reaction mixture was extracted with DCM and the combined organic layers were washed with Brine, dried over Na$_2$SO$_4$, filtered and concentrated under reduced pressure. The crude product was directly used in the next step without any further purification.

Step c: A mixture of N-((2-bromopyrimidin-5-yl)methyl)-2-chloro-6-(trifluoromethyl)pyridin-4-amine (1.0 Eq.), the corresponding boronic acid (1.16 Eq.), sodium carbonate (2 M, 33 mL/mmol) and tetrakis(triphenylphosphine) palladium (2 mol %) were suspended in an oxygen-free toluene/ethanol (1:1, v: v, 250 mL/mmol) solution and refluxed for 4 h under nitrogen atmosphere. The reaction mixture was cooled to room temperature, and excess solvent was removed under reduced pressure. The aqueous layer was extracted with ethyl acetate. The organic layer was washed once with saturate NaCl solution and once with water, dried over MgSO$_4$, filtered and the solution was concentrated under reduced pressure. The residue was purified by prep-HPLC using acetonitrile and water as eluent to afford the desired compound.

Step d: The corresponding 2-chloro-6-(trifluoromethyl)pyridin-4-amine derivative (1.0 Eq.) was dissolved in ethanol (5 mL/mmol) and SnCl$_2$ (5.0 Eq.) as well as concentrated HCl (catalytic amounts) was added. The reaction mixture was heated under reflux until TLC indicated full conversion. After cooling to room temperature the mixture was filtered and the crude product was purified via prep-HPLC using acetonitrile and water as eluent to afford the desired compound.

2-Chloro-N-((2-(4-chloro-3-nitrophenyl)pyrimidin-5-yl)methyl)-6-(trifluoromethyl)pyridin-4-amine (08)

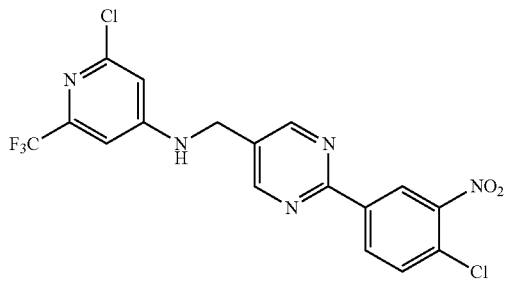

LC-MS: 443.98 (M+H)+. 1H NMR (500 MHZ, Acetone) δ 9.03 (s, 2H), 8.98 (d, J=2.0 Hz, 1H), 8.72 (dd, J=8.5, 2.0 Hz, 1H), 7.89 (d, J=8.5 Hz, 1H), 7.33 (s, 1H), 7.14 (d, J=1.9 Hz, 1H), 6.90 (d, J=1.7 Hz, 1H), 4.80 (d, J=5.9 Hz, 2H).

2-Chloro-N-((2-(3-nitrophenyl)pyrimidin-5-yl)methyl)-6-(trifuoromethyl)pyridin-4-amine (09)

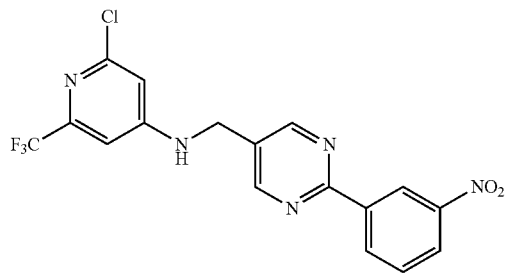

LC-MS: 409.92 (M+H)+. 1H NMR (500 MHZ, Acetone) δ 9.29-9.24 (m, 1H), 9.04 (s, 2H), 8.90-8.84 (m, 1H), 8.40 (ddd, J=8.2, 2.4, 1.0 Hz, 1H), 7.85 (t, J=8.0 Hz, 1H), 7.32 (s, 1H), 7.15 (d, J=1.9 Hz, 1H), 6.91 (d, J=1.8 Hz, 1H), 4.80 (d, J=6.0 Hz, 2H).

N-((2-(3-Aminophenyl)pyrimidin-5-yl)methyl)-2-chloro-6-(trifuoromethyl)pyridin-4-amine (10)

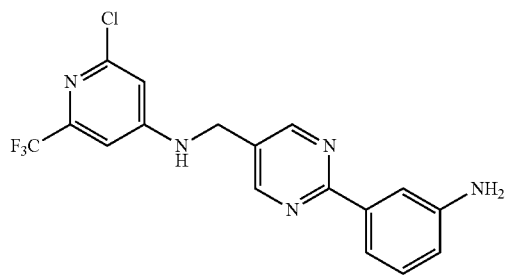

LC-MS: 380.1 (M+H)+. 1H NMR (500 MHZ, Acetone) δ 8.88 (s, 2H), 7.82-7.80 (m, 1H), 7.74-7.69 (m, 1H), 7.25 (s, 1H), 7.17 (t, J=7.8 Hz, 1H), 7.13 (d, J=2.0 Hz, 1H), 6.89 (d, J=1.7 Hz, 1H), 6.81 (ddd, J=7.9, 2.4, 0.9 Hz, 1H), 4.83 (s, 2H), 4.68 (s, 2H).

N-((2-(3-Amino-4-chlorophenyl)pyrimidin-5-yl)methyl)-2-chloro-6-(trifluoromethyl)pyridin-4-amine (11)

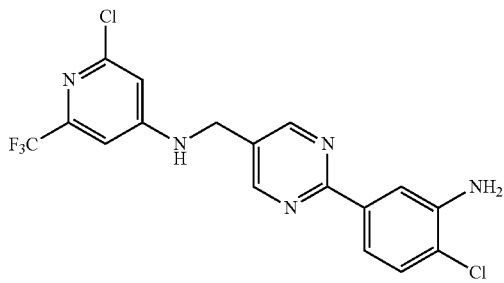

LC-MS: 413.95 (M+H). 1H NMR (500 MHZ. Acetone) δ 8.90 (s, 2H). 8.00 (s, 1H), 7.73 (d, J=8.3 Hz, 1H), 7.32 (d, J=8.3 Hz, 1H), 7.24 (s, 1H), 7.13 (s, 1H), 6.89 (s, 1H), 5.12 (s, 2H), 4.71 (d, J=5.6 Hz, 2H).

Example 3. Compounds 12 to 65

Preparation of benzimidazole/benzoxazole/benzothiazole-containing compounds 12 to 65.

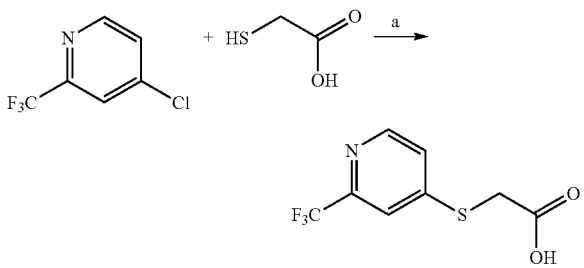

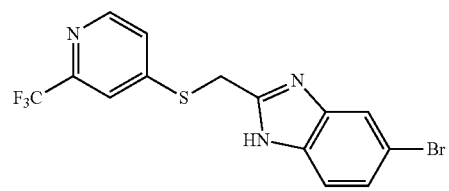

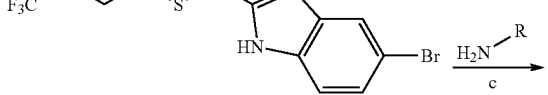

-continued

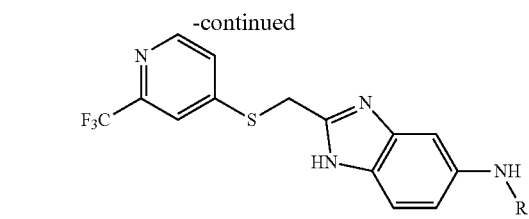

a: 2-mercaptoacetic acid, K₂CO₃, DMF, 65° C., 5 h, or 2-mercaptoacetic acid, DBU, MeCN, rt, 4 h;
b: DIPEA, T3P, DCM, rt, 1 h, then AcOH, 100° C., overnight;
c: corresponding aniline, Cs₂CO₃, 1,4-dioxane, Pd-175, microwave, 100° C., 1-3 h Step a:

(1a)

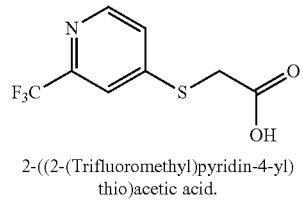

2-((2-(Trifluoromethyl)pyridin-4-yl)thio)acetic acid.

4-Chloro-2-(trifluoromethyl)pyridine (67 mg, 0.366 mmol), 2-mercaptoacetic acid (0.102 ml, 1.465 mmol) and K₂CO₃ (137 mg, 0.989 mmol) were dissolved in DMF (4 ml, 51.7 mmol) The resultant white suspension was heated at 130° C. for 5 h. The reaction mixture was acidified to pH 6 (sat NH₄Cl) and was washed in EtOAc, the aqueous phase was collected and acidified to pH 1 (1 M HCl), which resulted in a white solid crashing out. The resultant solid was filtered, rinsing with cold water, and dried in vacuo to afford 2-((2-(trifluoromethyl)pyridin-4-yl)thio) acetic acid (27 mg, 0.112 mmol, 30.6% yield) as a white solid.

¹H NMR (500 MHz, DMSO-d₆) δ 13.08 (s, 1H), 8.55 (d, J=5.3 Hz, 1H), 7.77 (d, J=1.8 Hz, 1H), 7.58 (dd, J=5.3, 1.9 Hz, 1H), 4.12 (s, 2H). MS (ESI⁺)m/z 238.4 (M+H)⁺.

Step b:

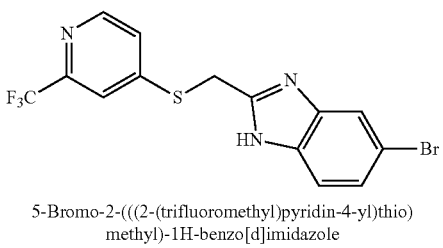

5-Bromo-2-(((2-(trifluoromethyl)pyridin-4-yl)thio)methyl)-1H-benzo[d]imidazole

To a solution of 2-((2-(trifluoromethyl)pyridin-4-yl)thio) acetic acid 1a (58 mg, 0.245 mmol) and 4-bromobenzene-1,2-diamine (46.0 mg, 0.245 mmol) in DCM (2 mL), cooled to 0° C. were added DIPEA (0.128 mL, 0.734 mmol) and T3P (50 wt % in EtOAc) (0.160 mL, 0.269 mmol) and the mixture was allowed to warm to RT and stirred for 18 h. The mixture was diltuted with saturated NaHCO₃ solution (20 mL) and extracted with EtOAc (2×20 mL). The combined organic layers were washed with water (20 mL), saturated NaCl solution (20 mL), dried (MgSO₄), filtered and concentrated under reduced pressure to afford a beige solid. AcOH (2 mL) was added and the mixture was heated to 100° C. for 24 h. The crude product was purified by chromatography on silica gel (12 g cartridge, 0-70% EtOAc/isohexane) to afford 5-bromo-2-(((2-(trifluoromethyl)pyridin-4-yl)thio) methyl)-1H-benzo[d]imidazole (66 mg, 0.169 mmol, 68.5% yield) as a yellow solid.

¹H NMR (500 MHz, DMSO-d₆) δ 12.75 (s, 0.5H), 12.69 (s, 0.5H), 8.56 (d, J=5.3 Hz, 1H), 7.97 (s, 1H), 7.78-7.65 (m, 2H), 7.49 (m, 1H), 7.31 (m, 1H), 4.72 (s, 2H). MS (ESI+) m/z 388/390 (M+H)⁺.

Step c:

(12)

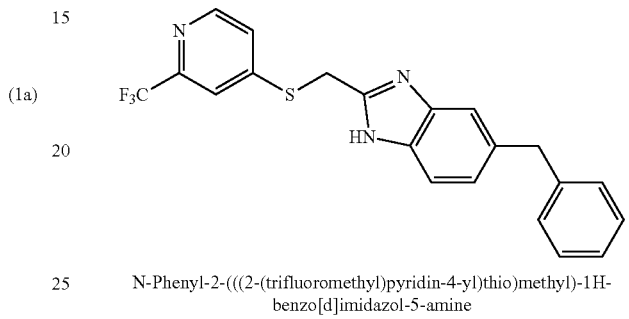

N-Phenyl-2-(((2-(trifluoromethyl)pyridin-4-yl)thio)methyl)-1H-benzo[d]imidazol-5-amine A solution of 5-bromo-2-(((2-(trifluoromethyl)pyridin-4-yl)thio) methyl)-1H-benzo[d]imi-dazole (20 mg, 0.052 mmol), aniline (4.70 μl, 0.052 mmol), cesium carbonate (33.6 mg, 0.103 mmol) and 1,4-dioxane (1 mL) in Pd-175 (4.02 mg, 5.15 μmol) was degassed with N₂ gas, before it was heated to 100° C. for 3 h under microwave irradiation. The reaction mixtures were diluted with water (5 mL) and DCM (5 mL), passed through hydrophobic frits and concentrated under reduced pressure. The crude product was purified by preparative HPLC (Waters, Basic (0.1% ammonium bicarbonate), Basic, Waters X-Bridge Prep-C18, 5 μm, 19×50 mm column, 20-50% MeCN in Water) to afford the desired product (4 mg, 9.59 μmol, 18.61% yield) as a pale orange solid.

LC-MS: 401.272 (M+H)⁺. ¹H NMR (500 MHZ, DMSO-d₆) δ 12.26 (s, 1H), 8.56 (d, J=5.3 Hz, 1H), 8.01 (d, J=1.8 Hz, 1H), 7.77 (dd, J=5.4, 1.8 Hz, 1H), 7.41 (d, J=8.5 Hz, 1H), 7.19 (t, J=7.7 Hz, 3H), 7.01 (d, J=7.4 Hz, 2H), 6.93 (d, J=8.4 Hz, 1H), 6.75 (t, J=7.3 Hz, 1H), 4.66 (s, 2H).

(13)

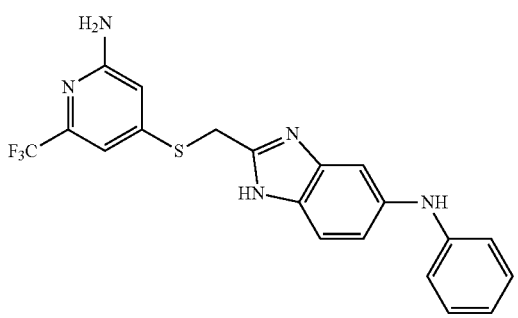

2-(((2-Amino-6-(trifluoromethyl)pyridin-4-yl)thio)methyl)-N-phenyl-1H-benzo[d]imidazol-5-amine LC-MS: 416.2 (M+H)⁺. ¹H NMR (500 MHZ, DMSO-d₆) δ 12.32 (s, 0.3H), 12.14 (s, 0.7H), 8.06 (s, 0.7H), 7.97 (s, 0.3H), 7.43 (d, J=8.6 Hz, 0.7H), 7.36 (d, J=9.0 Hz, 0.3H), 7.27 (m, 0.3H), 7.23-7.14 (m, 2.7H), 7.07-6.89 (m, 4H), 6.80-6.70 (m, 1H), 6.66-6.63 (m, 1H), 6.59-6.53 (m, 2H), 4.50 (s, 2H).

7.70 (dd, J=5.3, 1.8 Hz, 1H), 7.66 (d, J=2.4 Hz, 1H), 7.30-7.23 (m, 2H), 7.18 (dd, J=8.8, 2.3 Hz, 1H), 7.13 (d, J=7.8 Hz, 2H), 6.87 (t, J=7.3 Hz, 1H), 4.98 (s, 2H).

LC-MS: 469.2 (M+H)+

(14)

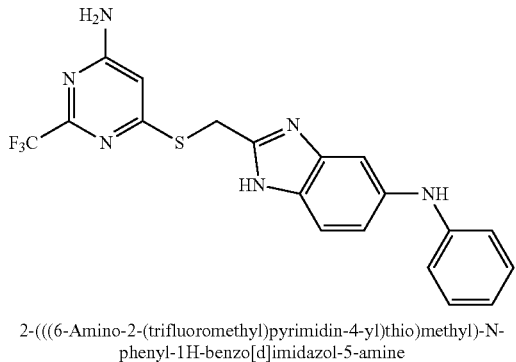

2-(((6-Amino-2-(trifluoromethyl)pyrimidin-4-yl)thio)methyl)-N-phenyl-1H-benzo[d]imidazol-5-amine LC-MS: 417.487 (M+H)$^+$. 1H NMR (500 MHZ, DMSO-d$_6$, 90° C.) δ 11.88 (brs, 1H), 7.66 (s, 1H), 7.40 (d, J=8.3 Hz, 1H), 7.29-7.12 (m, 5H), 6.99 (m, 3H), 6.76 (t, J=7.3 Hz, 1H), 6.64 (s, 1H), 4.57 (s, 2H).

(17)

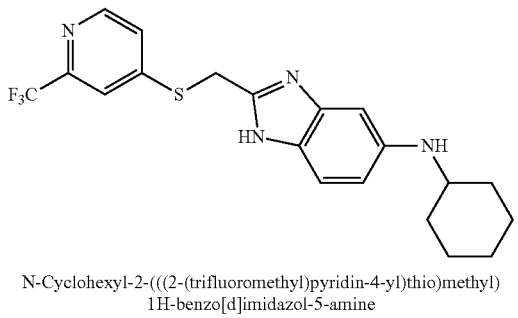

N-Cyclohexyl-2-(((2-(trifluoromethyl)pyridin-4-yl)thio)methyl)-1H-benzo[d]imidazol-5-amine LC-MS: m/z 407.6 (M+H)$^+$. $^1$H NMR (500 MHZ, DMSO-d$_6$) δ 11.71 (m, 1H), 8.54 (d, J=5.5 Hz, 1H), 7.93 (m, 1H), 7.72 (dd, J=5.5, 1.7 Hz, 1H), 7.25 (m, 1H), 6.55 (m, 2H), 4.82 (s, 1H), 4.55 (s, 2H), 3.20 (m, 1H), 1.96 (m, 2H), 1.74 (m, 2H), 1.62 (m, 1H), 1.44-1.13 (m, 5H).

(15)

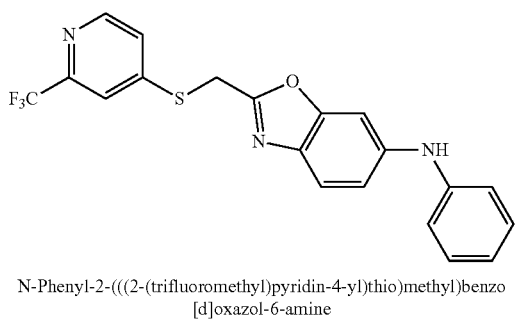

N-Phenyl-2-(((2-(trifluoromethyl)pyridin-4-yl)thio)methyl)benzo[d]oxazol-6-amine LC-MS: 402.2 (M+H)$^+$. $^1$H NMR (500 MHZ, DMSO-d$_6$) δ 8.59 (d, J=5.4 Hz, 1H), 8.41 (s, 1H), 7.99 (d, J=1.8 Hz, 1H), 7.76 (dd, J=5.4, 1.9 Hz, 1H), 7.54 (d, J=8.6 Hz, 1H), 7.31-7.23 (m, 3H), 7.14-7.08 (m, 2H), 7.05 (dd, J=8.7, 2.1 Hz, 1H), 6.87 (tt, J=7.3, 1.1 Hz, 1H), 4.86 (s, 2H).

(18)

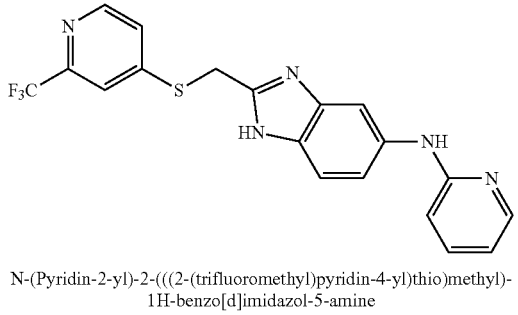

N-(Pyridin-2-yl)-2-(((2-(trifluoromethyl)pyridin-4-yl)thio)methyl)-1H-benzo[d]imidazol-5-amine LC-MS: 402.2 (M+H)$^+$. $^1$H NMR (500 MHZ, DMSO-d$_6$) δ 12.07 (s, 1H), 8.69-8.41 (m, 2H), 8.13 (d, J=4.9 Hz, 1H), 8.05-7.86 (m, 2H), 7.74 (dd, J=5.3, 1.8 Hz, 1H), 7.56-7.14 (m, 3H), 6.84-6.78 (m, 1H), 6.73-6.63 (m, 1H), 4.63 (s, 2H).

(16)

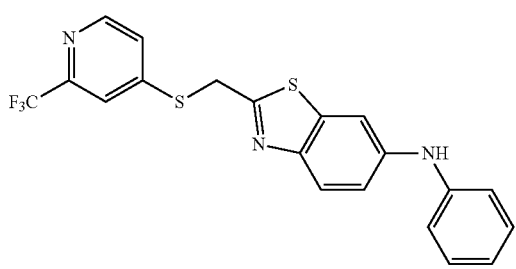

N-Phenyl-2-(((2-(trifluoromethyl)pyridin-4-yl)thio)methyl)benzo[d]thiazol-6-amine $^1$H NMR (500 MHZ, DMSO-d$_6$) δ 8.56 (d, J=5.3 Hz, 1H), 8.42 (s, 1H), 7.97 (d, J=1.8 Hz, 1H), 7.78 (d, J=8.8 Hz, 1H), (19)

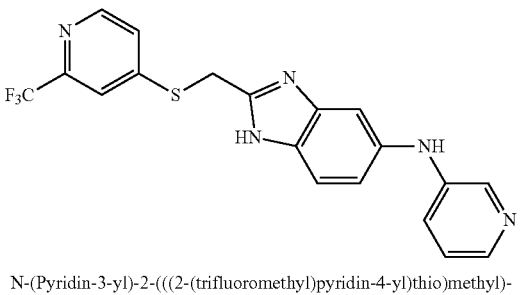

N-(Pyridin-3-yl)-2-(((2-(trifluoromethyl)pyridin-4-yl)thio)methyl)-1H-benzo[d]imidazol-5-amine LC-MS: 402.3 (M+H)$^+$. $^1$H NMR (500 MHZ, DMSO-d$_6$) δ 12.27 (s, 1H), 8.56 (d, J=5.3 Hz, 1H), 8.38-8.12 (m, 2H), 8.01 (d, J=1.8 Hz, 1H), 7.95 (br s, 1H), 7.77 (dd, J=5.3, 1.9 Hz, 1H), 7.51-7.32 (m, 2H), 7.27-7.13 (m, 2H), 6.96 (br s, 1H), 4.67 (s, 2H).

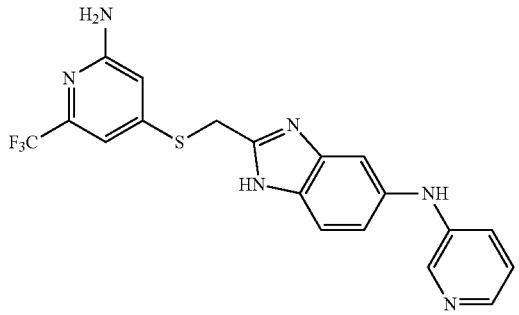

2-(((2-Amino-6-(trifluoromethyl)pyridin-4-yl)thio)methyl)-N-(pyridin-3-yl)-1H-benzo[d]imidazol-5-amine LC-MS: 417.2 (M+H)+. 1H NMR (500 MHZ, DMSO-d6) δ 12.37 (s, 0.4H), 12.21 (s, 0.6H), 8.39-8.24 (m, 2H), 8.00-7.91 (m, 1H), 7.47 (d, J=8.6 Hz, 1H), 7.43-7.37 (m, 1H), 7.22-7.13 (m, 2H), 7.03-6.90 (m, 2H), 6.65 (d, J=1.5 Hz, 1H), 6.57 (s, 2H), 4.51 (s, 2H).

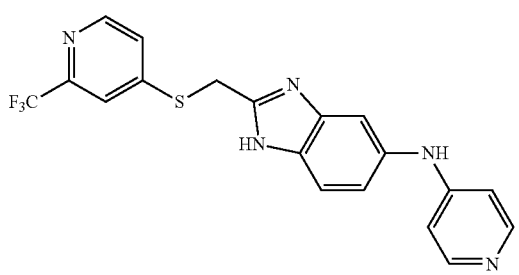

N-(Pyridin-4-yl)-2-(((2-(trifluoromethyl)pyridin-4-yl)thio)methyl)-1H-benzo[d]imidazol-5-amine LC-MS: 402.3 (M+H)+. 1H NMR (500 MHZ, DMSO-d6) δ 12.42 (s, 1H), 8.69 (br s, 1H), 8.57 (d, J=5.3 Hz, 1H), 8.13 (d, J=5.5 Hz, 2H), 8.01 (d, J=1.8 Hz, 1H), 7.77 (dd, J=5.4, 1.9 Hz, 1H), 7.50 (br s, 1H), 7.30 (br s, 1H), 7.02 (m, 1H), 6.81 (s, 2H), 4.69 (s, 2H).

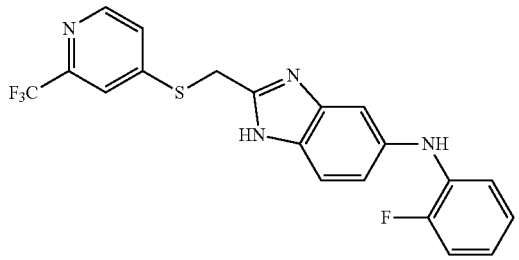

N-(2-Fluorophenyl)-2-(((2-(trifluoromethyl)pyridin-4-yl)thio)methyl)-1H-benzo[d]imidazol-5-amine LC-MS: 419.2 (M+H)+. 1H NMR (500 MHZ, DMSO-d6) δ 12.03 (s, 1H), 8.55 (d, J=5.3 Hz, 1H), 7.94 (br s, 1H), 7.76-7.71 (m, 1H), 7.41 (d, J=8.2 Hz, 2H), 7.21-7.11 (m, 3H), 7.02 (app t, J=7.7 Hz, 1H), 6.96 (d, J=8.5 Hz, 1H), 6.84 (m, 1H), 4.62 (s, 2H).

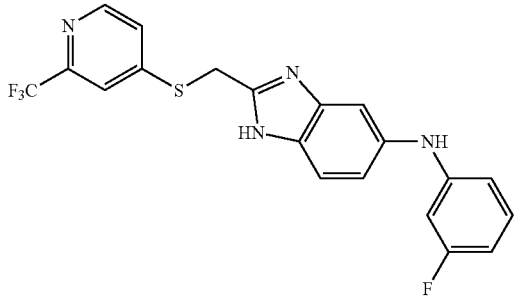

N-(3-Fluorophenyl)-2-(((2-(trifluoromethyl)pyridin-4-yl)thio)methyl)-1H-benzo[d]imidazol-5-amine LC-MS: 419.2 (M+H)+. 1H NMR (500 MHZ, DMSO-d6, 90° C.) δ 12.10 (s, 1H), 8.56 (d, J=5.4 Hz, 1H), 8.01-7.90 (m, 2H), 7.74 (dd, J=5.3, 1.7 Hz, 1H), 7.45 (d, J=8.5 Hz, 1H), 7.26 (s, 1H), 7.17 (app q, J=7.9 Hz, 1H), 7.03-6.95 (m, 1H), 6.79 (d, J=8.3 Hz, 1H), 6.70 (m, 1H), 6.52-6.44 (m, 1H), 4.64 (s, 2H).

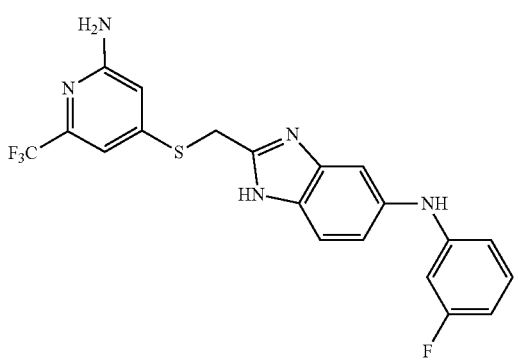

2-(((2-Amino-6-(trifluoromethyl)pyridin-4-yl)thio)methyl)-N-(3-fluorophenyl)-1H-benzo[d]imidazol-5-amine LC-MS: 434.2 (M+H)+. 1H NMR (500 MHz, DMSO-d6) δ 12.39 (s, 0.3H) 12.23 (s, 0.7H), 8.33 (s, 0.7H), 8.22 (s, 0.3H), 7.57-7.35 (m, 1H), 7.35-7.13 (m, 2H), 7.04-6.92 (m, 2H), 6.86-6.68 (m, 2H), 6.65 (d, J=1.5 Hz, 1H), 6.59-6.54 (m, 2H), 6.54-6.44 (m, 1H), 4.51 (s, 2H).

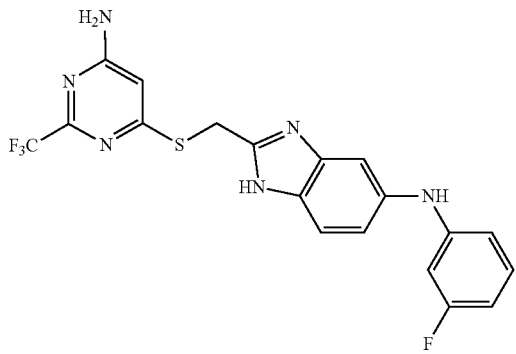

2-(((6-Amino-2-(trifluoromethyl)pyrimidin-4-yl)thio)methyl)-N-(3-fluorophenyl)-1H-benzo[d]imidazol-5-amine (25)

LC-MS: 435.2 (M+H)$^+$. $^1$H NMR (500 MHZ, DMSO-d$_6$) δ 12.32 (s, 0.4H), 12.15 (s, 0.4H), 8.33 (s, 0.6H), 8.22 (s, 0.4H), 7.61-7.34 (m, 3H), 7.33-7.12 (m, 2H), 7.00-6.90 (m, 1H), 6.82-6.62 (m, 2H), 6.60 (s, 1H), 6.58-6.41 (m, 1H), 4.57 (s, 2H).

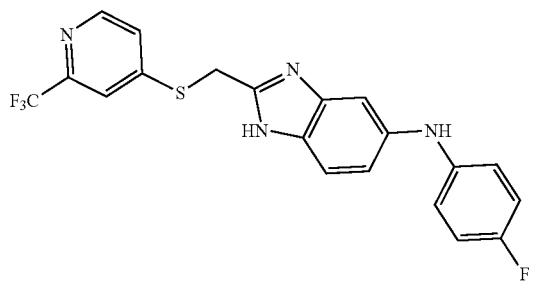

N-(4-Fluorophenyl)-2-(((2-(trifluoromethyl)pyridin-4-yl)thio)methyl)-1H-benzo[d]imidazol-5-amine (26)

LC-MS: 419.224 (M+H)$^+$. $^1$H NMR (500 MHZ, DMSO-d$_6$, 90° C.) δ 11.98 (brs, 1H), 8.55 (d, J=5.4 Hz, 1H), 7.93 (s, 1H), 7.77-7.53 (m, 2H), 7.39 (s, 1H), 7.22-6.80 (m, 4H), 4.61 (s, 2H).

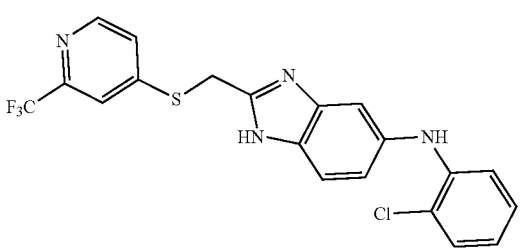

N-(2-Chlorophenyl)-2-(((2-(trifluoromethyl)pyridin-4-yl)thio)methyl)-1H-benzo[d]imidazol-5-amine (27)

LC-MS: 435.2/437.2 (M+H)$^+$. $^1$H NMR (500 MHZ, DMSO-d$_6$) δ 12.45 (s, 0.4H), 12.32 (s, 0.6H), 8.57 (d, J=5.3 Hz, 1H), 8.01 (m, 1H), 7.77 (dd, J=5.4, 1.8 Hz, 1H), 7.55 (s, 1H), 7.47 (d, J=8.6 Hz, 1H), 7.42-7.38 (m, 1H), 7.16 (d, J=2.1 Hz, 1H), 7.14 (d, J=4.1 Hz, 1H), 7.05-6.99 (m, 1H), 6.98 (dd, J=8.6, 2.1 Hz, 1H), 6.82 (m, 0.6H), 6.77 (m, 0.4H), 4.67 (s, 2H).

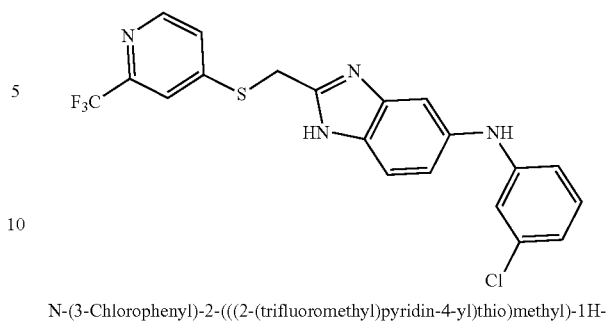

N-(3-Chlorophenyl)-2-(((2-(trifluoromethyl)pyridin-4-yl)thio)methyl)-1H-benzo[d]imidazol-5-amine (28)

LC-MS: 435.2 (M+H)$^+$. $^1$H NMR (500 MHZ, DMSO-d$_6$, 90° C.) δ 12.13 (s, 1H), 8.56 (d, J=5.3 Hz, 1H), 7.94 (d, J=1.8 Hz, 1H), 7.78-7.71 (m, 1H), 7.48-7.34 (m, 2H), 7.26-7.05 (m, 4H), 7.00 (d, J=8.8 Hz, 1H), 6.82 (app t, J=7.5 Hz, 1H), 4.63 (s, 2H).

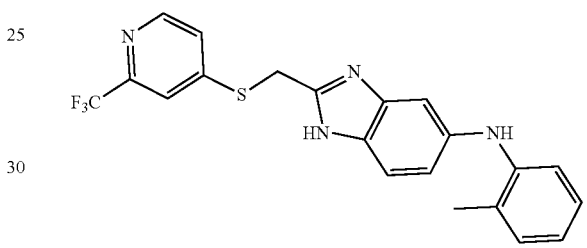

N-(o-Tolyl)-2-(((2-(trifluoromethyl)pyridin-4-yl)thio)methyl)-1H-benzo[d]imidazol-5-amine (29)

LC-MS: 415.3 (M+H)$^+$. $^1$H NMR (500 MHZ, DMSO-d$_6$) δ 12.24 (br s, 1H), 8.56 (d, J=5.4 20 Hz, 1H), 8.01 (d, J=1.8 Hz, 1H), 7.94 (br s, 1H), 7.77 (dd, J=5.3, 1.8 Hz, 1H), 7.40 (m, 1H), 7.28-6.75 (m, 5H), 6.58 (d, J=7.4 Hz, 1H), 4.65 (s, 2H), 2.22 (s, 3H).

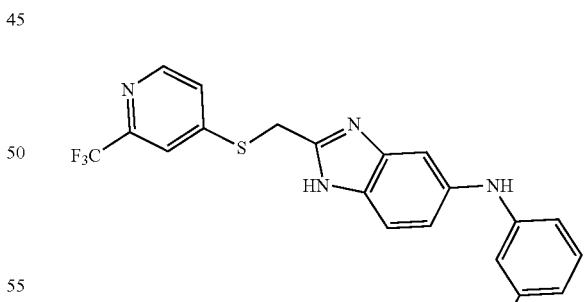

N-(m-Tolyl)-2-(((2-(trifluoromethyl)pyridin-4-yl)thio)methyl)-1H-benzo[d]imidazol-5-amine (30)

LC-MS: 415.3 (M+H)$^+$. $^1$H NMR (500 MHZ, DMSO-d$_6$) δ 12.24 (br s, 1H), 8.56 (d, J=5.4 Hz, 1H), 8.01 (d, J=1.8 Hz, 1H), 7.94 (m, 1H), 7.77 (dd, J=5.4, 1.8 Hz, 1H), 7.40 (m, 1H), 7.17 (m, 1H), 7.07 (app t, J=7.7 Hz, 1H), 6.92 (m, 1H), 6.83 (m, 1H), 6.58 (d, J=7.4 Hz, 1H), 4.65 (s, 2H), 2.22 (s, 3H).

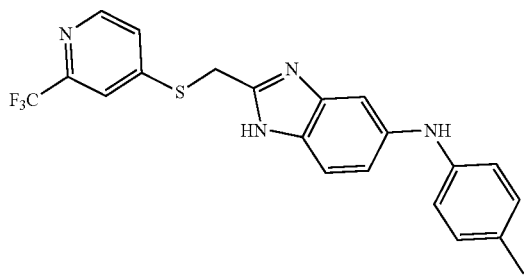

N-(p-Tolyl)-2-(((2-(trifluoromethyl)pyridin-4-yl)thio)methyl)-1H-benzo[d]imidazol-5-amine (31)

LC-MS: 415.3 (M+H)$^+$. $^1$H NMR (500 MHZ, DMSO-d$_6$) δ 12.15 (s, 1H), 8.56 (d, J=5.3 Hz, 1H), 8.01 (d, J=1.8 Hz, 1H), 7.90 (s, 1H), 7.76 (dd, J=5.4, 1.9 Hz, 1H), 7.38 (s, 1H), 7.13-6.82 (m, 6H), 4.64 (s, 2H), 2.22 (s, 3H).

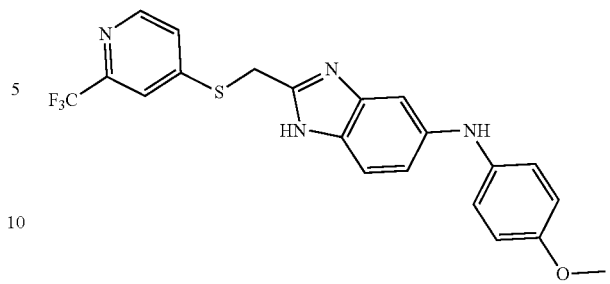

N-(4-Methoxyphenyl)-2-(((2-(trifluoromethyl)pyridin-4-yl)thio)methyl)-1H-benzo[d]imidazol-5-amine (34)

LC-MS: 431.3 (M+H)$^+$. $^1$H NMR (500 MHZ, DMSO-d$_6$) δ 12.09 (s, 1H), 8.56 (d, J=5.4 Hz, 1H), 8.00 (d, J=1.8 Hz, 1H), 7.76 (dd, J=5.4, 1.8 Hz, 2H), 7.35 (br s, 1H), 7.08-6.94 (m, 3H), 6.88-6.77 (m, 3H), 4.63 (s, 2H), 3.71 (s, 3H).

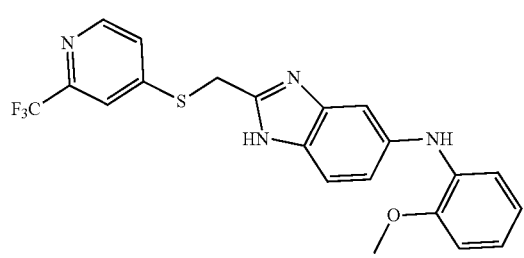

N-(2-Methoxyphenyl)-2-(((2-(trifluoromethyl)pyridin-4-yl)thio)methyl)-1H-benzo[d]imidazol-5-amine (32)

LC-MS: 431.3 (M+H)$^+$. $^1$H NMR (500 MHZ, DMSO-d$_6$) δ 12.24 (br s, 1H), 8.56 (d, J=5.3 Hz, 1H), 8.00 (d, J=1.8 Hz, 1H), 7.77 (d, J=5.4 Hz, 1H), 7.43-7.34 (m, 1H), 7.24-7.06 (m, 3H), 7.00-6.94 (m, 2H), 6.83-6.77 (m, 2H), 4.65 (s, 2H), 3.83 (s, 3H).

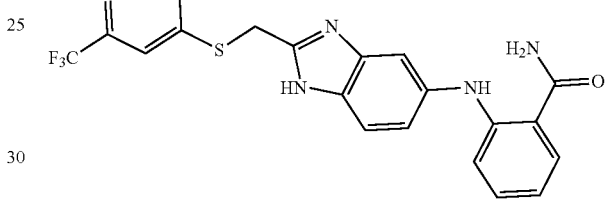

2-((2-(((2-(Trifluoromethyl)pyridin-4-yl)thio)methyl)-1H-benzo[d]imidazol-5-yl)amino)benzamide (35)

LC-MS: 444.3 (M+H)$^+$. $^1$H NMR (500 MHZ, DMSO-d$_6$) δ 12.56 (s, 0.4H), 12.43 (s, 0.6H), 10.02 (m, 1H), 8.57 (d, J=5.3 Hz, 1H), 8.09-7.94 (m, 2H), 7.81-7.75 (m, 1H), 7.70 (dd, J=7.9, 1.6 Hz, 1H), 7.63 (m, 0.4H), 7.54-7.35 (m, 2H), 7.33-7.21 (m, 2H), 7.17-7.06 (m, 1H), 6.99 (d, J=8.6 Hz, 1H), 6.74-6.66 (m, 1H), 4.68 (s, 2H).

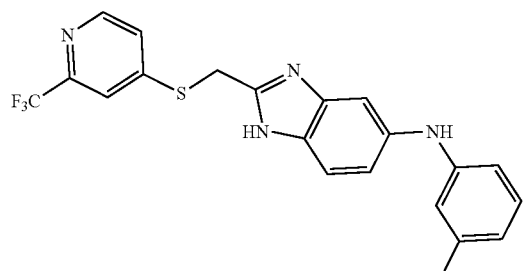

N-(3-Methoxyphenyl)-2-(((2-(trifluoromethyl)pyridin-4-yl)thio)methyl)-1H-benzo[d]imidazol-5-amine (33)

LC-MS: 431.3 (M+H)$^+$. $^1$H NMR (500 MHZ, DMSO-d$_6$) δ 12.24 (s, 1H), 8.56 (d, J=5.4 Hz, 1H), 8.12-7.98 (m, 2H), 7.77 (dd, J=5.4, 1.8 Hz, 1H), 7.41 (s, 1H), 7.20 (s, 1H), 7.08 (app t, J=8.1 Hz, 1H), 6.94 (s, 1H), 6.62-6.53 (m, 2H), 6.34 (d, J=8.0 Hz, 1H), 4.66 (s, 2H), 3.69 (s, 3H).

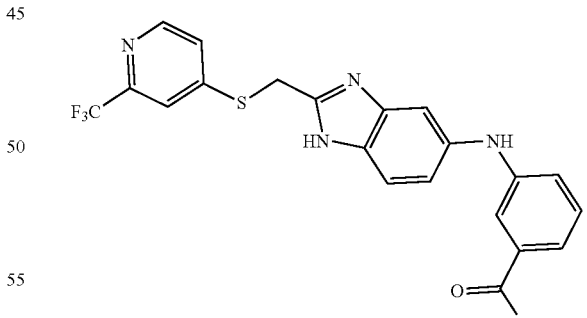

3-((2-(((2-(Trifluoromethyl)pyridin-4-yl)thio)methyl)-1H-benzo[d]imidazol-5-yl)amino)benzamide (36)

LC-MS: 444.2 (M+H)$^+$. $^1$H NMR (500 MHZ, DMSO-d$_6$) δ 12.41 (s, 0.3H), 12.25 (s, 0.7H), 8.56 (d, J=5.3 Hz, 1H), 8.21 (s, 0.7 H), 8.08 (s, 0.3H), 8.01 (d, J=1.8 Hz, 1H), 7.90-7.65 (m, 2H), 7.58-7.52 (m, 1H), 7.51-7.42 (m, 1H), 7.33-7.05 (m, 5H), 7.00 (dd, J=8.3, 1.4 Hz, 0.3H), 6.93 (dd, J=8.6, 2.1 Hz, 0.7H), 4.70-4.63 (m, 2H).

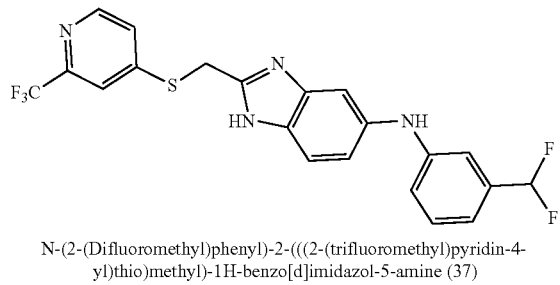 [SMILES: FC(F)c1cccc(Nc2ccc3[nH]c(CSc4ccnc(C(F)(F)F)c4)nc3c2)c1]

N-(2-(Difluoromethyl)phenyl)-2-(((2-(trifluoromethyl)pyridin-4-yl)thio)methyl)-1H-benzo[d]imidazol-5-amine (37)

LC-MS: 452.2 (M+H)$^+$. $^1$H NMR (500 MHZ, DMSO-d$_6$) δ 12.45 (s, 0.4H), 12.30 (s, 0.6H), 8.56 (d, J=5.3 Hz, 1H), 8.32 (s, 0.6H), 8.20 (s, 0.4H), 8.01 (d, J=1.9 Hz, 1H), 7.77 (dd, J=5.3, 1.9 Hz, 1H), 7.48-7.37 (m, 1H), 7.34-7.24 (m, 1H), 7.24-7.05 (m, 3H), 7.04-6.98 (m, 1H), 6.97-6.85 (m, 2H), 4.67 (s, 2H).

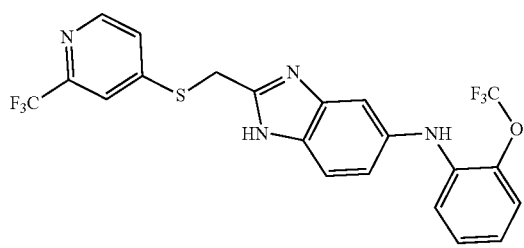

N-(2-(Trifluoromethyl)phenyl)-2-(((2-(trifluoromethyl)pyridin-4-yl)thio)methyl)-1H-benzo[d]imidazol-5-amine (38)

LC-MS: 485.2 (M+H)$^+$. $^1$H NMR (500 MHZ, DMSO-d$_6$) δ 12.46 (s, 0.4H), 12.30 (s, 0.6H), 8.56 (d, J=5.3 Hz, 1H), 8.01 (dd, J=6.8, 1.8 Hz, 1H), 7.86 (s, 0.6H), 7.83-7.73 (m, 1.4H), 7.47 (d, J=8.6 Hz, 0.6H), 7.40 (d, J=8.4 Hz, 0.4H), 7.32-7.25 (m, 1H), 7.20-7.11 (m, 2H), 7.04 (dd, J=8.5, 1.9, 0.4H), 6.98 (dd, J=8.6, 2.1 Hz, 0.6H), 6.85 (ddd, J=8.4, 7.1, 1.8 Hz, 0.6H), 6.80 (m, 0.4H), 4.67 (s, 2H).

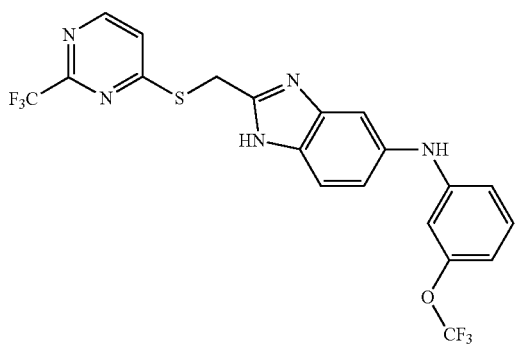

N-(3-(Trifluoromethoxy)phenyl)-2-(((2-(trifluoromethyl)pyridin-4-yl)thio)methyl)-1H-benzo[d]imidazol-5-amine (39)

LC-MS: 485.5 (M+H)$^+$. $^1$H NMR (500 MHZ, DMSO-d$_6$) δ 12.37 (m, 1H), 8.56 (d, J=5.3 Hz, 1H), 8.43 (s, 0.6H), 8.32 (s, 0.4H), 8.01-7.97 (m, 1H), 7.79-7.73 (m, 1H), 7.49 (d, J=8.6 Hz, 0.6H), 7.42 (d, J=8.5 Hz, 0.4H), 7.35-7.18 (m, 2H), 7.04-6.89 (m, 2H), 6.87 (s, 0.6H), 6.80 (s, 0.4H), 6.66 (d, J=8.2 Hz, 0.6H), 6.62 (d, J=7.6 Hz, 0.4H), 4.68 (s, 2H).

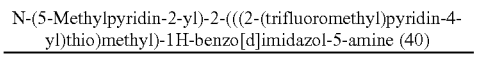

N-(5-Methylpyridin-2-yl)-2-(((2-(trifluoromethyl)pyridin-4-yl)thio)methyl)-1H-benzo[d]imidazol-5-amine (40)

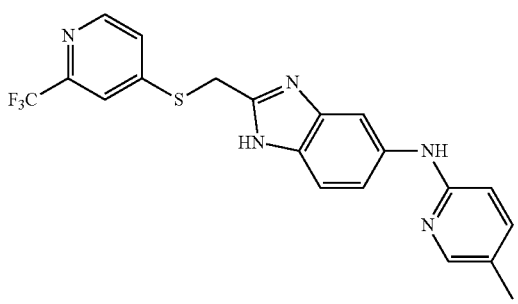

LC-MS: 416.3 (M+H)$^+$. $^1$H NMR (500 MHZ, DMSO-d$_6$) δ 12.29 (s, 1H), 8.81 (br s, 1H), 8.56 (d, J=5.3 Hz, 1H), 8.11 (br s, 1H), 8.03-7.94 (m, 2H), 7.77 (dd, J=5.4, 1.9 Hz, 1H), 7.41-7.35 (m, 2H), 7.17 (m, 1H), 6.75 (d, J=8.5 Hz, 1H), 4.65 (s, 2H), 2.17 (s, 3H).

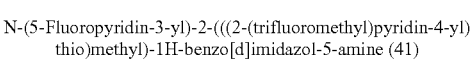

N-(5-Fluoropyridin-3-yl)-2-(((2-(trifluoromethyl)pyridin-4-yl)thio)methyl)-1H-benzo[d]imidazol-5-amine (41)

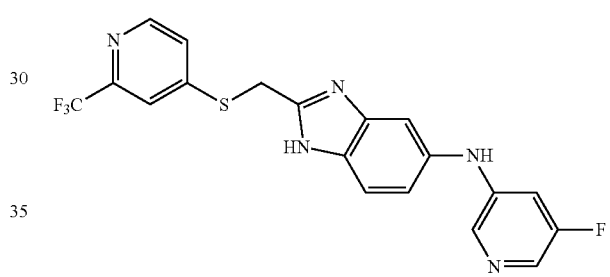

LC-MS: 420.1 (M+H)$^+$. $^1$H NMR (500 MHZ, DMSO-d$_6$) δ 12.40 (s, 1H), 8.56 (d, J=5.4 Hz, 2H), 8.13 (t, J=2.0 Hz, 1H), 8.01 (d, J=1.8 Hz, 1H), 7.88 (d, J=2.5 Hz, 1H), 7.77 (dd, J=5.4, 1.9 Hz, 1H), 7.49 (d, J=8.5 Hz, 1H), 7.33-7.24 (m, 1H), 7.13 (d, J=11.8 Hz, 1H), 7.01 (dd, J=8.5, 2.1 Hz, 1H), 4.69 (s, 2H).

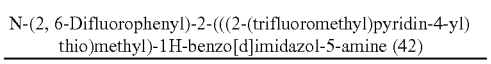

N-(2, 6-Difluorophenyl)-2-(((2-(trifluoromethyl)pyridin-4-yl)thio)methyl)-1H-benzo[d]imidazol-5-amine (42)

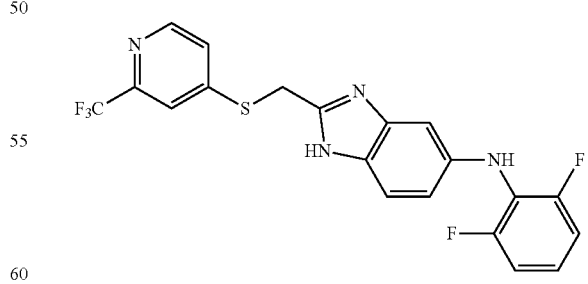

LC-MS: 437.5 (M+H)$^+$. $^1$H NMR (500 MHZ, DMSO-d$_6$) δ 8.55 (d, J=5.4 Hz, 1H), 7.99 (d, J=1.8 Hz, 1H), 7.85-7.62 (m, 2H), 7.41-7.26 (m, 1H), 7.20-7.09 (m, 3H), 6.78-6.55 (m, 2H), 4.63 (s, 2H). exchangeable benzimidazole proton not resolved.

N-(3, 5-Difluorophenyl)-2-(((2-(trifluoromethyl)pyridin-4-yl)thio)methyl)-1H-benzo[d]imidazol-5-amine (43)

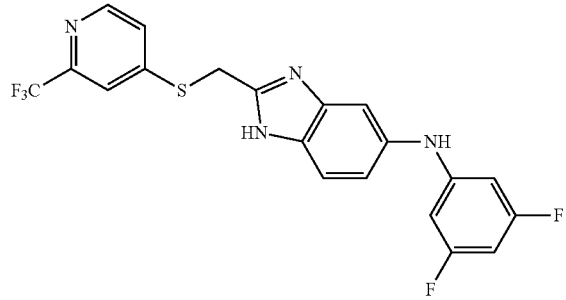

LC-MS: 437.2 (M+H)+. 1H NMR (500 MHZ, DMSO-d6) δ 12.51 (s, 0.4H), 12.35 (s, 0.6H), 8.69-8.41 (m, 2H), 8.01 (s, 1H), 7.77 (d, J=5.4 Hz, 1H), 7.59-7.38 (m, 1H), 7.27-7.20 (m, 1H), 6.99-6.93 (m, 1H), 6.65-6.31 (m, 3H), 4.69 (s, 2H).

N-(2, 5-Difluorophenyl)-2-(((2-(trifluoromethyl)pyridin-4-yl)thio)methyl)-1H-benzo[d]imidazol-5-amine (44)

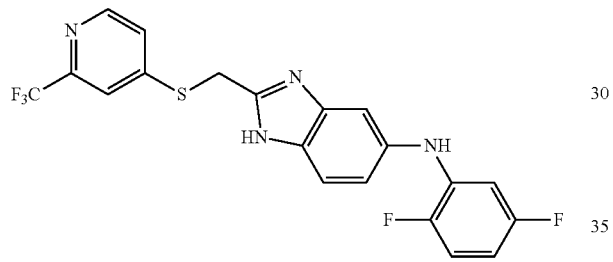

LC-MS: 437.2 (M+H)+. 1H NMR (500 MHZ, DMSO-d6) δ 12.48 (s, 0.4H), 12.33 (s, 0.6H), 8.56 (d, J=5.3 Hz, 1H), 8.09 (s, 0.8H), 8.01 (s, 1.2H), 7.79-7.74 (m, 1H), 7.49 (d, J=8.6 Hz, 0.6H), 7.25 (m, 2H), 7.06 (d, J=8.3 Hz, 0.4H), 7.00 (dd, J=8.6, 2.1 Hz, 0.6H), 6.95-6.69 (m, 1H), 6.63-6.43 (m, 1H), 4.68 (s, 2H).

N-(2, 4-Difluorophenyl)-2-(((2-(trifluoromethyl)pyridin-4-yl)thio)methyl)-1H-benzo[d]imidazol-5-amine (45)

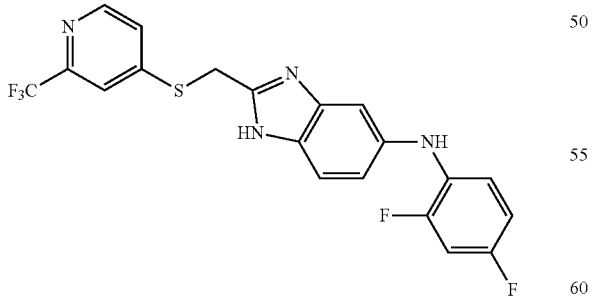

LC-MS: 437.1 (M+H)+. 1H NMR (500 MHZ, DMSO-d6) δ 12.24 (s, 1H), 8.56 (d, J=5.3 Hz, 1H), 8.00 (d, J=1.8 Hz, 1H), 7.76 (dd, J=5.4, 1.9 Hz, 1H), 7.71 (br s, 1H), 7.39 (d, J=8.6 Hz, 1H), 7.31-7.16 (m, 2H), 7.12-6.74 (m, 3H), 4.65 (s, 2H).

N-(2, 3-Difluorophenyl)-2-(((2-(trifluoromethyl)pyridin-4-yl)thio)methyl)-1H-benzo[d]imidazol-5-amine (46)

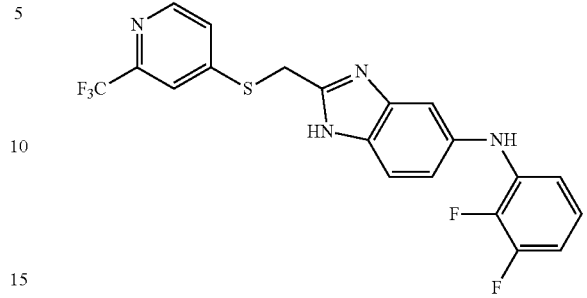

LC-MS: 437.2 (M+H)+. 1H NMR (500 MHZ, DMSO-d6) δ 12.45 (0.4H), 12.30 (s, 0.6H), 8.56 (d, J=5.3 Hz, 1H), 8.22-7.96 (m, 2H), 7.76 (dd, J=5.4, 1.9 Hz, 1H), 7.52-7.35 (m, 1H), 7.32-7.10 (m, 1H), 7.05-6.83 (m, 3H), 6.83-6.70 (m, 1H), 4.67 (s, 2H).

N-(3, 4-Difluorophenyl)-2-(((2-(trifluoromethyl)pyridin-4-yl)thio)methyl)-1H-benzo[d]imidazol-5-amine (47)

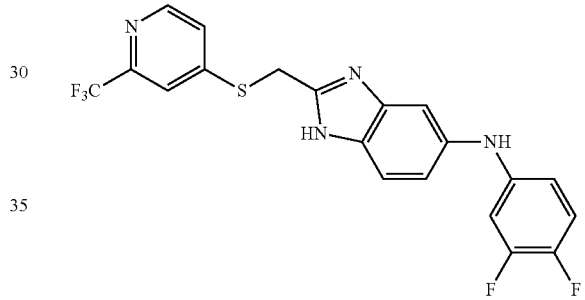

1H NMR (500 MHZ, DMSO-d6) δ 12.44 (s, 0.4H), 12.26 (s, 0.6H), 8.56 (d, J=5.3 Hz, 1H), 8.24 (s, 0.6H), 8.11 (s, 0.4H), 8.01 (d, J=1.8 Hz, 1H), 7.76 (dd, J=5.4, 1.9 Hz, 1H), 7.42 (m, 1H), 7.31-7.11 (m, 2H), 7.03-6.66 (m, 3H), 4.67 (s, 2H).

N-(2-Fluoro-3-(trifluoromethyl)phenyl)-2-(((2-(trifluoromethyl)pyridin-4-yl)thio)methyl)-1H-benzo[d]imidazol-5-amine (48)

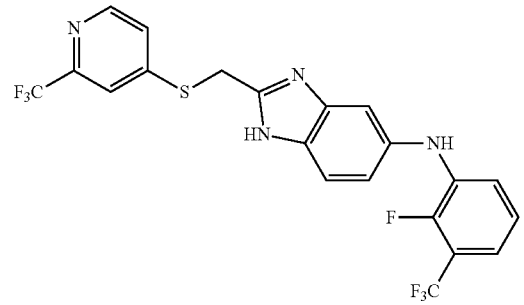

LC-MS: 487.2 (M+H)+. 1H NMR (500 MHZ, DMSO-d6) δ 12.42 (s, 1H), 8.60-8.54 (m, 1H), 8.23-8.09 (m, 1H), 8.01 (d, J=1.8 Hz, 1H), 7.77 (dd, J=5.3, 1.8 Hz, 1H), 7.51-7.20 (m, 3H), 7.19-7.13 (m, 1H), 7.11-6.95 (m, 2H), 4.68 (s, 2H).

N-(2-Fluoro-4-(trifluoromethyl)phenyl)-2-(((2-(trifluoromethyl)pyridin-4-yl)thio)methyl)-1H-benzo[d]imidazol-5-amine (49)

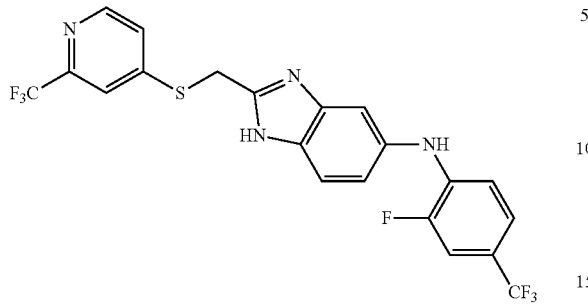

LC-MS: 487.1 (M+H)$^+$. $^1$H NMR (500 MHZ, DMSO-d$_6$) δ 12.44 (s, 1H), 8.56 (d, J=5.3 Hz, 1H), 8.26-8.15 (m, 1H), 8.01 (d, J=1.9 Hz, 1H), 7.77 (dd, J=5.3, 1.8 Hz, 1H), 7.59-7.44 (m, 1H), 7.39 (dd, J=11.4, 8.4 Hz, 1H), 7.36-7.17 (m, 2H), 7.11 (m, 1H), 7.02 (d, J=8.4 Hz, 1H), 4.69 (s, 2H).

N-(2-Fluoro-5-(trifluoromethyl)phenyl)-2-(((2-(trifluoromethyl)pyridin-4-yl)thio)methyl)-1H-benzo[d]imidazol-5-amine (50)

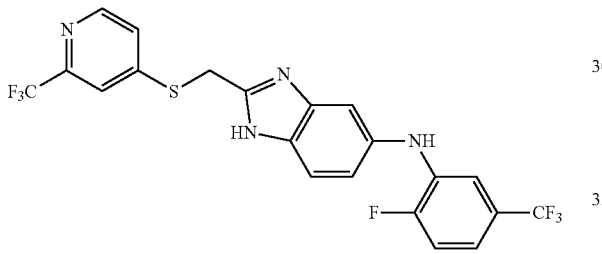

LC-MS: 487.2 (M+H)$^+$. $^1$H NMR (500 MHZ, DMSO-d$_6$) δ 12.42 (m, 1H), 8.56 (d, J=5.3 Hz, 1H), 8.30-8.12 (m, 1H), 8.05-7.97 (m, 1H), 7.77 (dd, J=5.3, 1.9 Hz, 1H), 7.57-7.44 (m, 1H), 7.39 (dd, J=11.3, 8.4 Hz, 1H), 7.36-7.17 (m, 2H), 7.16-7.07 (m, 1H), 7.07-6.96 (m, 1H), 4.69 (s, 2H).

N-(3-Fluoro-4-methylphenyl)-2-(((2-(trifluoromethyl)pyridin-4-yl)thio)methyl)-1H-benzo[d]imidazol-5-amine (51)

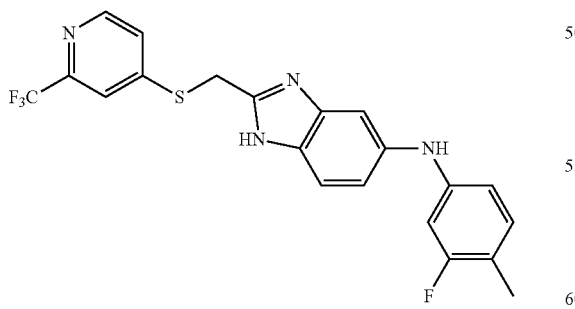

LC-MS: 433.1 (M+H)$^+$. $^1$H NMR (500 MHZ, DMSO-d$_6$) δ 12.41 (s, 0.4H), 12.23 (s, 0.6H), 8.56 (d, J=5.3 Hz, 1H), 8.16 (s, 1H), 8.01 (m, 1H), 7.76 (dd, J=5.3, 1.8 Hz, 1H), 7.40 (m, 1H), 7.19 (m, 1H), 7.06 (m, 1H), 6.93 (m, 1H), 6.80-6.63 (m, 2H), 4.66 (s, 2H), 2.12 (s, 3H).

N-(3-Fluoro-4-(trifluoromethyl)phenyl)-2-(((2-(trifluoromethyl)pyridin-4-yl)thio)methyl)-1H-benzo[d]imidazol-5-amine (52)

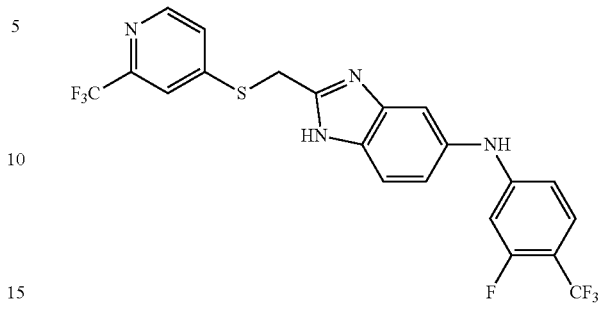

LC-MS: 487.2 (M+H)$^+$. $^1$H NMR (500 MHZ, DMSO-d$_6$) δ 12.56 (s, 0.4H), 12.42 (s, 0.6H), 8.96-8.87 (m, 1H), 8.57 (d, J=5.3 Hz, 1H), 8.01 (d, J=1.8 Hz, 1H), 7.77 (dd, J=5.4, 1.9 Hz, 1H), 7.51-7.43 (m, 2H), 7.33-7.26 (m, 1H), 7.05-6.98 (m, 1H), 6.86-6.75 (m, 2H), 4.70 (s, 2H).

N-(3-Fluoro-4-methoxyphenyl)-2-(((2-(trifluoromethyl)pyridin-4-yl)thio)methyl)-1H-benzo[d]imidazol-5-amine (53)

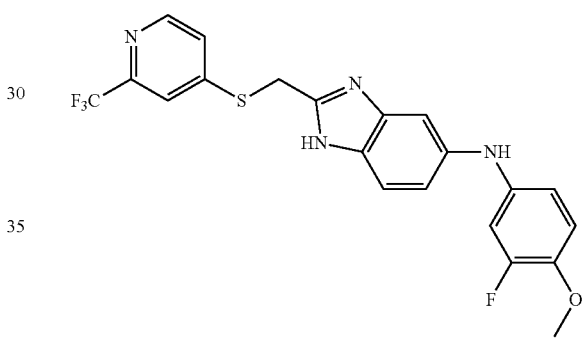

LC-MS: 449.2 (M+H)$^+$. $^1$H NMR (500 MHZ, DMSO-d$_6$) δ 12.19 (br s, 1H), 8.56 (d, J=5.3 Hz, 1H), 8.00 (d, J=1.8 Hz, 1H), 7.94 (br s, 1H), 7.76 (dd, J=5.3, 1.9 Hz, 1H), 7.40 (d, J=8.6 Hz, 1H), 7.17-6.98 (m, 2H), 6.98-6.73 (m, 3H), 4.65 (s, 2H), 3.77 (s, 3H).

N-(3-Fluoro-4-methoxyphenyl)-2-(((2-(trifluoromethyl)pyridin-4-yl)thio)methyl)-1H-benzo[d]imidazol-5-amine (54)

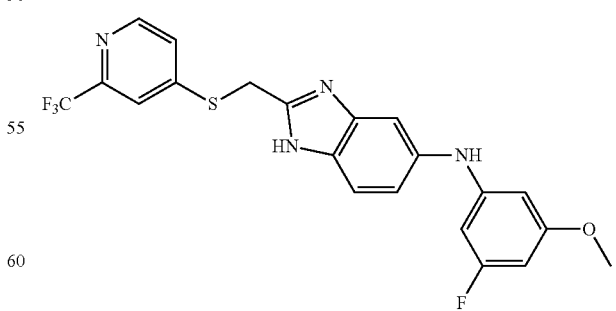

LC-MS: 450.2 (M+H)$^+$. $^1$H NMR (500 MHZ, DMSO-d$_6$) δ 12.46 (s, 0.4H), 12.28 (s, 0.6H), 8.56 (d, J=5.3 Hz, 1H), 8.33 (s, 0.6H), 8.21 (s, 0.4H), 8.01 (m, 1H), 7.76 (m, 1H), 7.48 (d, J=8.6 Hz, 0.6H), 7.40 (d, J=8.0 Hz, 0.4H), 7.28 (br s 0.4H), 7.21 (d, J=2.1 Hz, 0.6H), 7.01 (dd, J=8.7, 1.8, Hz, 0.4H), 6.93 (dd, J=8.6, 2.1 Hz, 0.6H), 6.34 (dd, J=10.6, 2.2 Hz, 1H), 6.31-6.23 (m, 1H), 6.20-6.10 (m, 1H), 4.71-4.64 (m, 2H), 3.70 (s, 1.8H), 3.69 (s, 1,2H).

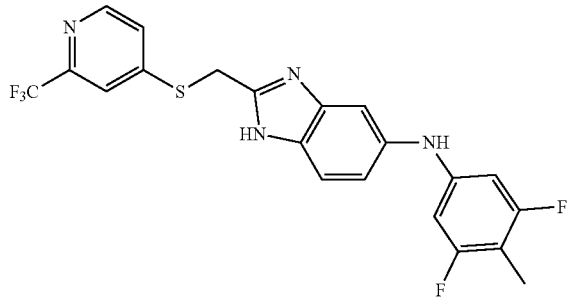

N-(3,5-Difluoro-4-methylphenyl)-2-(((2-(trifluoromethyl)pyridin-4-yl)thio)methyl)-1H-benzo[d]imidazol-5-amine (55)

LC-MS: 451.2 (M+H)+. 1H NMR (500 MHZ, DMSO-d6) δ 12.32 (m, 1H), 8.56 (d, J=5.3 Hz, 1H), 8.44-8.25 (m, 1H), 8.01 (d, J=1.8 Hz, 1H), 7.76 (dd, J=5.4, 1.9 Hz, 1H), 7.46 (br s, 1H), 7.22 (br s, 1H), 6.95 (br s, 1H), 6.56 (br s, 2H), 4.68 (s, 2H), 2.02 (s, 3H).

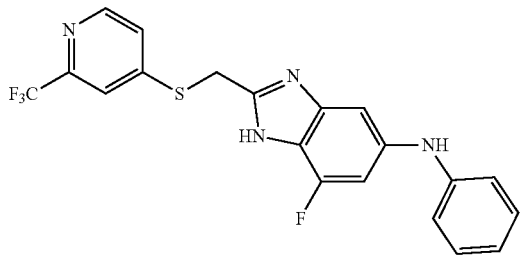

7-Fluoro-N-phenyl-2-(((2-(trifluoromethyl)pyridin-4-yl)thio)methyl)-1H-benzo[d]imidazol-5-amine (56)

LC-MS: 419.4 (M+H)+. 1H NMR (500 MHZ, DMSO-d6) δ 12.45 (br s, 1H), 8.57 (d, J=5.3 Hz, 1H), 8.21 (s, 1H), 8.01 (d, J=1.8 Hz, 1H), 7.75 (dd, J=5.4, 1.9 Hz, 1H), 7.30-7.16 (m, 2H), 7.13-7.03 (m, 2H), 6.97 (br s, 1H), 6.83 (tt, J=7.3, 1.1 Hz, 1H), 6.69 (d, J=12.8 Hz, 1H), 4.67 (s, 2H).

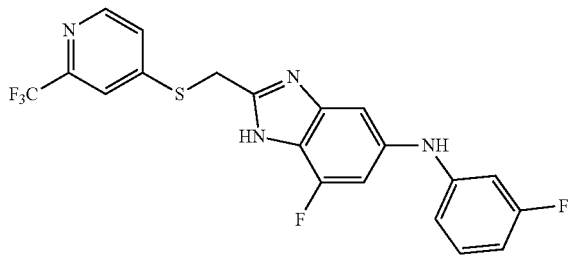

7-Fluoro-N-(3-fluorophenyl-2-(((2-(trifluoromethyl)pyridin-4-yl)thio)methyl)-1H-benzo[d]imidazol-5-amine (57)

LC-MS: 437.3 (M+H)+. 1H NMR (500 MHZ, DMSO-d6) δ 12.56 (br s, 1H), 8.57 (d, J=5.3 Hz, 1H), 8.45 (s, 1H), 8.02 (d, J=1.8 Hz, 1H), 7.75 (dd, J=5.4, 1.9 Hz, 1H), 7.23 (m, 1H), 7.03 (d, J=1.8 Hz, 1H), 6.88-6.69 (m, 3H), 6.58 (td, J=8.4, 2.5 Hz, 1H), 4.69 (s, 2H).

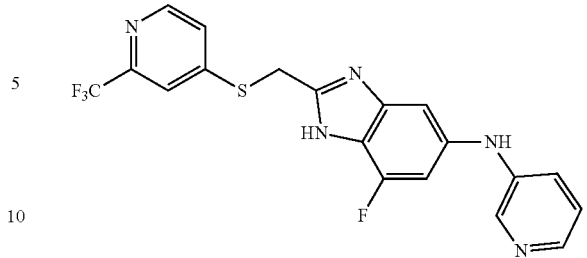

7-Fluoro-N-(pyridin-3-yl)-2-(((2-(trifluoromethyl)pyridin-4-yl)thio)methyl)-1H-benzo[d]imidazol-5-amine (58)

LC-MS: 420.4 (M+H)+. 1H NMR (500 MHZ, DMSO-d6) δ 12.51 (s, 1H), 8.57 (d, J=5.3 Hz, 1H), 8.41 (br s, 1H), 8.34 (d, J=2.8 Hz, 1H), 8.03 (dd, J=4.6, 1.4 Hz, 1H), 8.01 (d, J=1.8 Hz, 1H), 7.75 (dd, J=5.3, 1.9 Hz, 1H), 7.47 (m, 1H), 7.23 (dd, J=8.3, 4.6 Hz, 1H), 7.00 (br s, 1H), 6.73 (d, J=12.5 Hz, 1H), 4.69 (s, 2H).

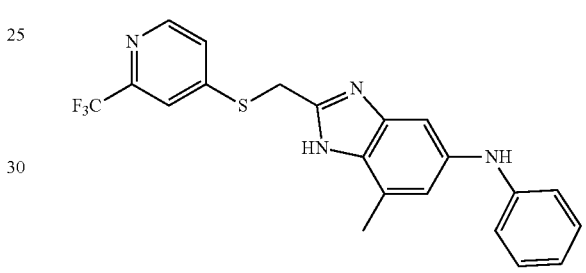

7-Methyl-N-phenyl-2-(((2-(trifluoromethyl)pyridin-4-yl)thio)methyl)-1H-benzo[d]imidazol-5-amine (59)

LC-MS: 415.1 (M+H)+. 1H NMR (500 MHZ, DMSO-d6) δ 12.44 (s, 0.3H), 12.14 (s, 0.7H), 8.57 (d, J=5.3 Hz, 0.3H), 8.54 (d, J=5.3 Hz, 0.7H), 8.21 (m, 0.7H), 8.05 (br s, 0.3H), 7.97 (s, 0.7H), 7.85 (s, 0.3H), 7.79 (m, 0.3H), 7.73 (dd, J=5.4, 1.9 Hz, 0.7H), 7.20-7.16 (m, 2H), 7.11-6.90 (m, 3H), 6.83-6.67 (m, 2H), 4.66 (s, 2H), 2.45 (s, 2.1H), 2,42 (s, 0.9H).

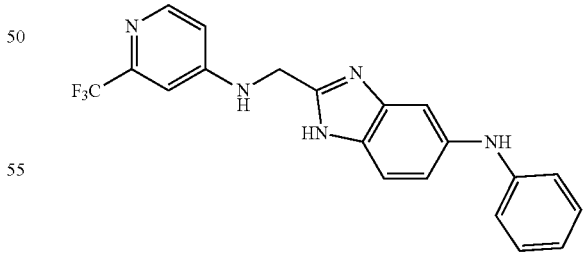

N-Phenyl-2-(((2-(trifluoromethyl)pyridin-4-yl)amino)methyl)-1H-benzo[d]imidazol-5-amine (60)

LC-MS: 384.2 (M+H)+. 1H NMR (500 MHZ, DMSO-d6) δ 12.24 (s, 0.4H), 12.07 (s, 0.6H), 8.19 (d, J=5.7 Hz, 1H), 8.03 (s, 0.6H), 7.92 (s, 0.4H), 7.70 (t, J=5.6 Hz, 1H), 7.44 (d, J=8.5 Hz, 1H), 7.52-7.13 (m, 4H), 6.84-6.66 (m, 2H), 4.58 (s, 1.2H), 4.57 (s, 0.8H).

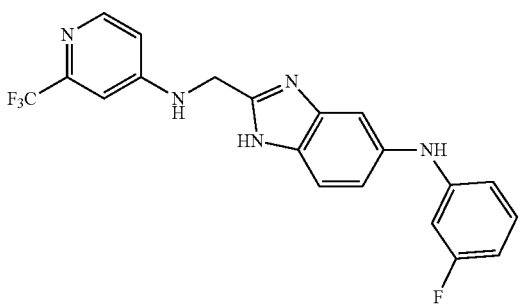

N-(3-Fluorophenyl-2-(((2-(trifluoromethyl)pyridin-4-yl)amino)methyl)-1H-benzo[d]imidazol-5-amine (61)

LC-MS: 402.2 (M+H)+. $^1$H NMR (500 MHZ, DMSO-$d_6$) δ 12.22 (s, 1H), 8.27 (br s, 1H), 8.19 (d, J=5.7 Hz, 1H), 7.72 (t, J=5.8 Hz, 1H), 7.45 (d, J=8.6 Hz, 1H), 7.24 (br s, 1H), 7.18 (m, 1H), 7.08 (d, J=2.3 Hz, 1H), 6.95 (dd, J=8.9, 1.8 Hz, 1H), 6.84-6.74 (m, 2H), 6.69 (d, J=12.1 Hz, 1H), 6.49 (t, J=8.3 Hz, 1H), 4.63-4.56 (m, 2H).

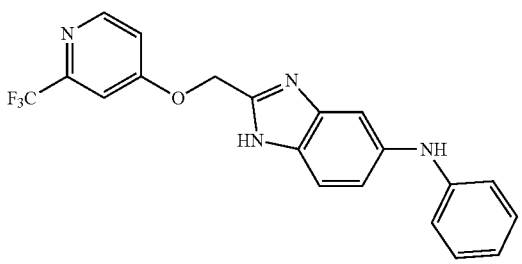

N-Phenyl-2-(((2-(trifluoromethyl)pyridin-4-yl)oxy)methyl)-1H-benzo[d]imidazol-5-amine (62)

LC-MS: 385.2 (M+H)+. $^1$H NMR (500 MHZ, DMSO-$d_6$) δ 12.58 (s, 0.3H), 12.40 (s, 0.7H), 8.63 (d, J=5.7 Hz, 1H), 8.14-8.09 (m, 1H), 7.62 (d, J=2.5 Hz, 1H), 7.54-7.38 (m, 2H), 7.35-7.13 (m, 3H), 7.09-6.93 (m, 3H), 6.80-6.70 (m, 1H), 5.50 (s, 2H).

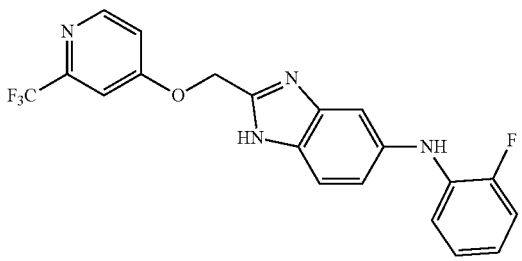

N-(2-Fluorophenyl-2-(((2-(trifluoromethyl)pyridin-4-yl)oxy)methyl)-1H-benzo[d]imidazol-5-amine (63)

LC-MS: 403.2 (M+H)+. $^1$H NMR (500 MHZ, DMSO-$d_6$) δ 12.71-12.37 (m, 1H), 8.62 (d, J=5.7 Hz, 1H), 7.91-7.72 (m, 1H), 7.62 (d, J=2.5 Hz, 1H), 7.41 (m, 2H), 7.33-6.94 (m, 5H), 6.91-6.78 (m, 1H), 5.50 (s, 2H).

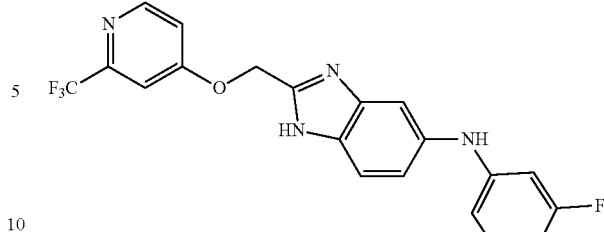

N-(3-Fluorophenyl-2-(((2-(trifluoromethyl)pyridin-4-yl)oxy)methyl)-1H-benzo[d]imidazol-5-amine (64)

LC-MS: 403.3 (M+H)+. $^1$H NMR (500 MHZ, DMSO-$d_6$) δ 12.50 (m, 1H), 8.63 (d, J=5.7 Hz, 1H), 8.44-8.22 (m, 1H), 7.63 (d, J=2.4 Hz, 1H), 7.59-7.48 (m, 1H), 7.44 (dd, J=5.7, 2.5 Hz, 1H), 7.38-7.23 (m, 1H), 7.24-7.15 (m, 1H), 7.01 (br s, 1H), 6.85-6.64 (m, 2H), 6.57-6.48 (m, 1H), 5.52 (s, 2H).

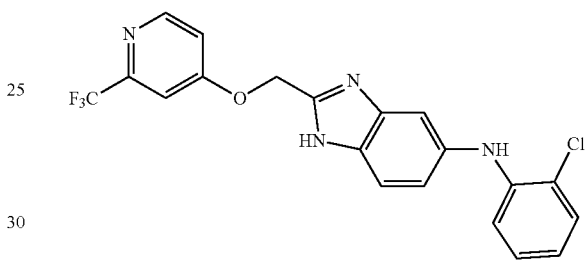

N-(2-Chlorophenyl)-2-(((2-(trifluoromethyl)pyridin-4-yl)oxy)methyl)-1H-benzo[d]imidazol-5-amine (65)

LC-MS: 419.1/421.2 (M+H)+. $^1$H NMR (500 MHZ, DMSO-$d_6$) δ 12.56 (s, 1H), 8.63 (d, J=5.7 Hz, 1H), 7.63 (d, J=2.5 Hz, 1H), 7.60-7.48 (m, 2H), 7.44 (dd, J=5.7, 2.5 Hz, 1H), 7.40 (d, J=8.0 Hz, 1H), 7.34-7.12 (m, 3H), 7.09-7.01 (m, 1H), 6.85-6.78 (m, 1H), 5.52 (s, 2H).

Example 4: PqsR Inverse Agonistic Activity of Test Compounds (Reporter Gene Assay in *E. coli*)

Inhibition of pqsR-dependent gene expression of test compounds was determined in an *E. coli* based-galactosidase reporter gene assay. [19] *Escherichia coli* DH5a was transfected with pEAL08-2 plasmid encoding pqsR under control of promoter tac and β-galactosidase reporter gene lacZ under control of promoter pqsA. Antagonistic effects of compounds were evaluated in the presence of/in competition to 50 nM PQS. A positive control was used to ensure the reliability of individual assays. First, PQS was diluted in methanol and added to the wells of a glass coated 96-deep-well plate, and the solvent was evaporated. Then, compounds were added in 5 μL DMSO to final concentrations of 0.001-10 μM. Overnight cultures of *E. coli* DH5ax pEAL08-2 were diluted 1:100 in LB medium with ampicillin (50 μg/ml) and incubated at 37° C. with shaking until it reached an OD600 of 0.2. Finally, 995 μL of culture was added to each well and the β-galactosidase activity was determined by ortho-nitrophenyl-β-galactoside conversion in permeabilized cells after a 2.5 h incubation period (37° C., 180 rpm). OD600, OD420, and OD550 were measured using POLARstar Omega (BMG Labtech, Ortenberg, Germany), and the activity was expressed as ratio of the slope of B-galactosidase activity between basal control (no PQS)

and solvent control. $IC_{50}$ values of antagonists were determined by variation of the concentration of the test compounds.

Results of measurements of example test compounds are summarized below.

The following Example Compounds showed an IC50-value of equal to or below 50 nM towards PqsR-dependent transcription: 01, 02, 05, 12, 14, 37, 42, 45, 56, 59, 61.

The following Example Compounds showed an IC50-value between 51 and 250 nM towards PqsR-dependent transcription: 15, 16, 17, 34, 46.

The following Example Compounds showed an IC50-value between 251 nM and 1000 nM towards PqsR-dependent transcription: 36.

None of the tested compounds showed any bacteriostatic or bactericidal effects in the cell-based test system.

Example 5: Pyocyanin Assay

Inhibition of *P. aeruginosa* pyocyanin production by compounds was determined photometrically as described before. [20] In short, an overnight culture of PA14 in PPGAS medium was washed, diluted in medium to a start OD600 of 0.02, and incubated for 16 h (37° C., 200 rpm, relative humidity 75%) in the presence of test compounds. Then, cultures were extracted with chloroform and re-extracted with 0.2 M HCl. Protonated red colored pyocyanin was determined by measuring OD520 and normalizing to OD600.

Results of measurements of example test compounds are summarized below.

The following Example Compounds showed an IC50-value of equal to or below 100 nM towards pyocyanin production: 02, 23, 24, 27, 47, 51, 56, 57, 61.

The following Example Compounds showed an IC50-value between 101 and 200 nM towards pyocyanin production: 03, 04, 06, 07, 08, 13, 14, 25, 29, 30, 31, 33, 35, 37, 42, 45, 48, 49, 55, 59.

The following Example Compounds showed an IC50-value between 201 and 500 nM towards pyocyanin production: 01, 05, 09, 12, 14, 15, 18, 20, 38, 41, 46, 50, 54, 58, 60, 64, 65.

The following Example Compounds showed an IC50-value 501 and 1000 nM towards pyocyanin production: 10, 11, 16, 17, 19.

Example 6: Compound Solubility

Kinetic Turbidimetric Aqueous Solubility at room temperature for 5 min. Test compound was diluted in PBS buffer to give a range of concentrations (typically 0.4, 2, 4, 20, 40, 100, and 200 µM, final DMSO concentration 2%) and incubated at room temperature for 5 min. Absorbance was measured at a wavelength of 620 nm and the solubility was estimated from the concentration of test compound that produces an increase in absorbance above the vehicle control (i.e., 1% DMSO in buffer). Data was analyzed by fitting a four parameter sigmoidal function to the measured and normalized absorbances and AUC calculation providing access to Log S (decadic logarithm of the solubility).

The following Example Compounds showed a Kinetic Turbidimetric Aqueous Solubility at room temperature for 5 min above or equal to 100 µM: 10, 19, 60, 61.

The following Example Compounds showed a Kinetic Turbidimetric Aqueous Solubility at room temperature for 5 min above 50 µM: 01, 18, 35, 36, 41, 58.

The following Example Compounds showed a Kinetic Turbidimetric Aqueous Solubility at room temperature for 5 min above 25 µM: 05, 07, 11, 12, 14, 20, 22, 25, 26, 34, 40, 42, 43, 44, 45, 49, 53, 54, 56, 64.

The following Example Compounds showed a Kinetic Turbidimetric Aqueous Solubility at room temperature for 5 min above 10 µM: 02, 03, 04, 06, 08, 09, 13, 23, 24, 28, 30, 31, 33, 37, 39, 46, 47, 55, 57, 59, 63.

Example 7: Metabolic Stability Tests in Mouse Liver Microsomes (MLM)

For the evaluation of phase I metabolic stability, the compound (1 µM) was incubated with 0.5 mg/mL MLM (Corning) and 1 mM NADPH at 37° C. for 0, 5, 10, 15 and 30 min. The metabolic stability of Verapamil, Diphenhydramine and Benzydamine (1 µM each) were determined in parallel to confirm the enzymatic activity of the MLM. The incubation was stopped by addition of 2 volumes of acetonitrile containing internal standard (1 µM Leucine Enkephaline). Samples were centrifuged (15 min, 3,500 rpm). Concentration of the remaining test compound at the different time points was analyzed by HPLC-MS/MS and used to determine half-life (t1/2).

Results of measurements of example test compounds are summarized below.

The following Example Compounds showed a half-life (t1/2) above 60 min towards MLM: 08, 37, 45.

The following Example Compounds showed a half-life (t1/2) between 31 min and 60 min towards MLM: 09, 36.

REFERENCES

1. Frei R, Breitbach A S, Blackwell H E (2012) Angew Chem Int Ed Engl 51:5226-5229
2. Yang L, Rybtke M T, Jakobsen T H, Hentzer M, Bjarnsholt T, Givskov M, Tolker-Nielsen T (2009) Antimicrob Agents Chemother 53:2432-2443
3. O'Loughlin C T, Miller L C, Siryaporn A, Drescher K, Semmelhack M F, Bassler B L (2013) Proc Natl Acad Sci USA 110:17981-17986
4. Hentzer M, Wu H, Andersen J B, Riedel K, Rasmussen T B, Bagge N, Kumar N, Schembri M A, Song Z, Kristoffersen P, Manefield M, Costerton J W, Molin S, Eberl L, Steinberg P, Kjelleberg S, Hoiby N, Givskov M (2003) EMBO J 22:3803-3815
5. Hentzer M, Riedel K, Rasmussen T B, Heydorn A, Andersen J B, Parsek M R, Rice S A, Eberl L, Molin S, Hoiby N, Kjelleberg S, Givskov M (2002) Microbiology 148:87-102
6. Rasmussen T B, Skindersoe M E, Bjarnsholt T, Phipps R K, Christensen K B, Jensen P O, Andersen J B, Koch B, Larsen T O, Hentzer M, Eberl L, Hoiby N, Givskov M (2005) Microbiology 151:1325-1340
7. Jakobsen T H, van G M, Phipps R K, Shanmugham M S, Christensen L D. Alhede M, Skindersoe M E, Rasmussen T B, Friedrich K, Uthe F, Jensen P O, Moser C, Nielsen K F, Eberl L, Larsen T O, Tanner D, Hoiby N, Bjarnsholt T, Givskov M (2012) Antimicrob Agents Chemother 56:2314-2325
8. Hinsberger S, de Jong J C, Groh M, Haupenthal J, Hartmann R W (2014) Eur J Med Chem 76C: 343-351
9. Storz M P, Brengel C, Weidel E, Hoffmann M, Hollemeyer K, Steinbach A, Muller R, Empting M, Hartmann R W (2013) ACS Chem Biol 8:2794-2801

10. Sahner J H, Brengel C, Storz M P, Groh M, Plaza A, Muller R, Hartmann R W (2013) J Med Chem 56:8656-8664
11. Weidel E, de Jong J C, Brengel C, Storz M P, Braunshausen A, Negri M, Plaza A, Steinbach A, Muller R, Hartmann R W (2013) J Med Chem 56:6146-6155
12. Calfee M W, Coleman J P, Pesci E C (2001) Proc Natl Acad Sci USA 98:11633-11637
13. Pistorius D, Ullrich A, Lucas S, Hartmann R W, Kazmaier U, Muller R (2011) Chembiochem 12:850-853
14. Lesic B, Lepine F, Deziel E, Zhang J, Zhang Q, Padfield K, Castonguay M H, Milot S, Stachel S, Tzika A A, Tompkins R G, Rahme L G (2007) PLOS Pathog 3:1229-1239
15. Storz M P, Maurer C K, Zimmer C, Wagner N, Brengel C, de Jong J C, Lucas S, Musken M, Haussler S, Steinbach A, Hartmann R W (2012) J Am Chem Soc 134:16143-16146
16. Coleman J P, Hudson L L, Mcknight S L, Farrow J M, III, Calfee M W, Lindsey C A, Pesci E C (2008) J Bacteriol 190:1247-1255
17. Klein T, Henn C, de Jong J C, Zimmer C, Kirsch B, Maurer C K, Pistorius D, Muller R, Steinbach A, Hartmann R W (2012) ACS Chem Biol 7:1496-1501
18. Zender M, Klein T, Henn C, Kirsch B, Maurer C K, Kail D, Ritter C, Dolezal O, Steinbach A, Hartmann R W (2013) J Med Chem 56:6761-6774
19. Lu C, Kirsch B, Zimmer C, de Jong J C, Henn C, Maurer C K, Musken M, Haussler S, Steinbach A, Hartmann R W (2012) Chem Biol 19:381-390
20. Lu C, Maurer C K, Kirsch B, Steinbach A, Hartmann R W (2014) Angew Chem Int Ed Engl 53:1109-1112
21. Ilangovan A, Fletcher M, Rampioni G, Pustelny C, Rumbaugh K, Heeb S, Camara M, Truman A, Chhabra S R, Emsley J, Williams P (2013) PLOS Pathog 9: e1003508
22. Maurer C K, Steinbach A, Hartmann R W (2013) J Pharm Biomed Anal 86C: 127-134
23. Zhang Y, Miller R M (1992) Appl Environ Microbiol 58:3276-3282

Overall, the results presented herein show that compounds of the invention are anti-pathogenic compounds exhibiting both anti-virulence and anti-biofilm activity allowing for an effective treatment of bacterial infections and their application in in vivo.

The features of the present invention disclosed in the specification and/or the claims may both separately and in any combination thereof be material for realizing the invention in various forms thereof.

The invention claimed is:
1. A compound of the formula (I):

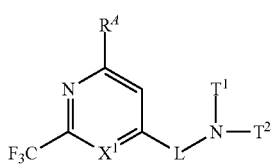

or a pharmacologically acceptable salt thereof, wherein
$R^A$ represents a hydrogen atom, a halogen atom, $NH_2$ or $NH(C_{1-3}alkyl)$;
$X^1$ represents CH or N;
L is a group represented by formula (L-1), (L-2) or (L-3):

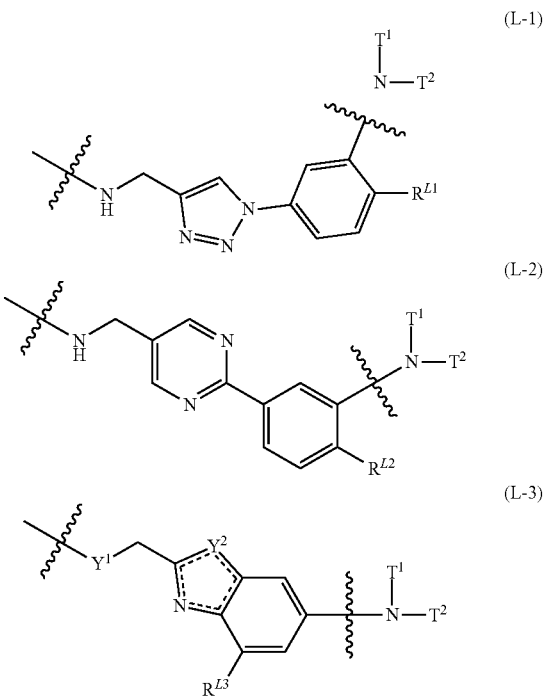

wherein
$R^{L1}$, $R^{L2}$ and $R^{L3}$ each, independently of one another, represents a hydrogen atom, F, Cl; or a $(C_1-C_3)$alkyl group, which may be substituted by one or more, identical or different, group(s) selected from a halogen atom, OH, =O, and $NH_2$;
$Y^1$ and $Y^2$ each, independently of one another, is NH, O, or S;
each "-----", independently of one another, represents a single bond or a double bond, wherein at least one " --- " in the ring of formula (L-3) is a double bond;
$T^1$ is a hydrogen atom; and $T^2$ represents a hydrogen atom; or an aryl, heteroaryl, aralkyl or hetero-aralkyl group, all of which groups may be substituted by one, two or more, identical or different, group(s) selected from: a halogen atom, OH, =O, $NH_2$, $(C_1-C_3)$alkyl which may be substituted by one or more, identical or different, group(s) selected from a halogen atom, OH, =O, and $NH_2$; $(C_1-C_3)$alkoxy which may be substituted by one or more, identical or different, group(s) selected from a halogen atom, OH, =O, and $NH_2$; and $C(O)NR^{T1}R^{T2}$;
$R^{T1}$ and $R^{T2}$ each, independently of one another, represents a hydrogen atom or a $(C_1-C_3)$alkyl group, which may be substituted by one or more, identical or different, group(s) selected from a halogen atom, OH, =O, and $NH_2$;
or
$T^1$ and $T^2$ both represent O.

2. The compound according to claim 1, or a pharmacologically acceptable salt thereof, wherein L is a group of formula (L-1).

3. The compound according to claim 2, or a pharmacologically acceptable salt thereof, wherein $R^{L1}$ represents a hydrogen atom.

4. The compound according to claim 2, or a pharmacologically acceptable salt thereof, wherein $X^1$ is CH; and $R^A$ represents a hydrogen atom or Cl.

5. The compound according to claim 1, or a pharmacologically acceptable salt thereof, wherein L is a group of formula (L-2).

6. The compound according to claim 1, or a pharmacologically acceptable salt thereof, wherein L is a group of formula (L-3).

7. The compound according to claim 6, or a pharmacologically acceptable salt thereof, wherein $R^A$ represents a hydrogen atom or $NH_2$.

8. The compound according to claim 6, or a pharmacologically acceptable salt thereof, wherein the group represented by formula (L-3) contains one of the following groups as a partial structure:

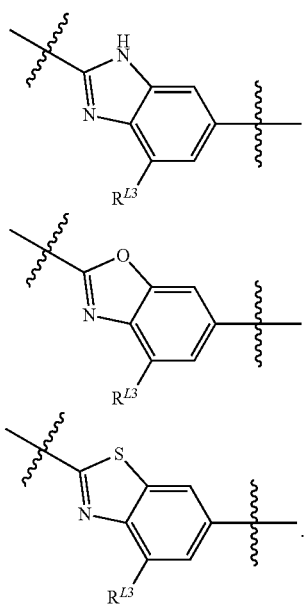

9. The compound according to claim 2, or a pharmacologically acceptable salt thereof, wherein $T^1$ is a hydrogen atom; and $T^2$ represents a 6-membered aryl or heteroaryl group, which group may be substituted by one, two or more, identical or different, group(s) selected from: a halogen atom, OH, =O, $NH_2$, $(C_1-C_3)$alkyl which may be substituted by one or more, identical or different, group(s) selected from a halogen atom, OH, =O, and $NH_2$; $(C_1-C_3)$alkoxy which may be substituted by one or more, identical or different, group(s) selected from a halogen atom, OH, =O, and $NH_2$; and $C(O)NR^{T1}R^{T2}$;

$R^{T1}$ and $R^{T2}$ each, independently of one another, represents a hydrogen atom or a $(C_1-C_3)$alkyl group, which may be substituted by one or more, identical or different, group(s) selected from a halogen atom, OH, =O, and $NH_2$.

10. The compound according to claim 1, or a pharmacologically acceptable salt thereof, wherein the group $NT^1T^2$ is selected from the groups:

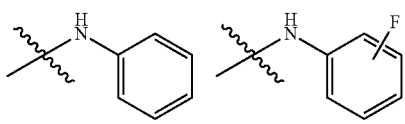

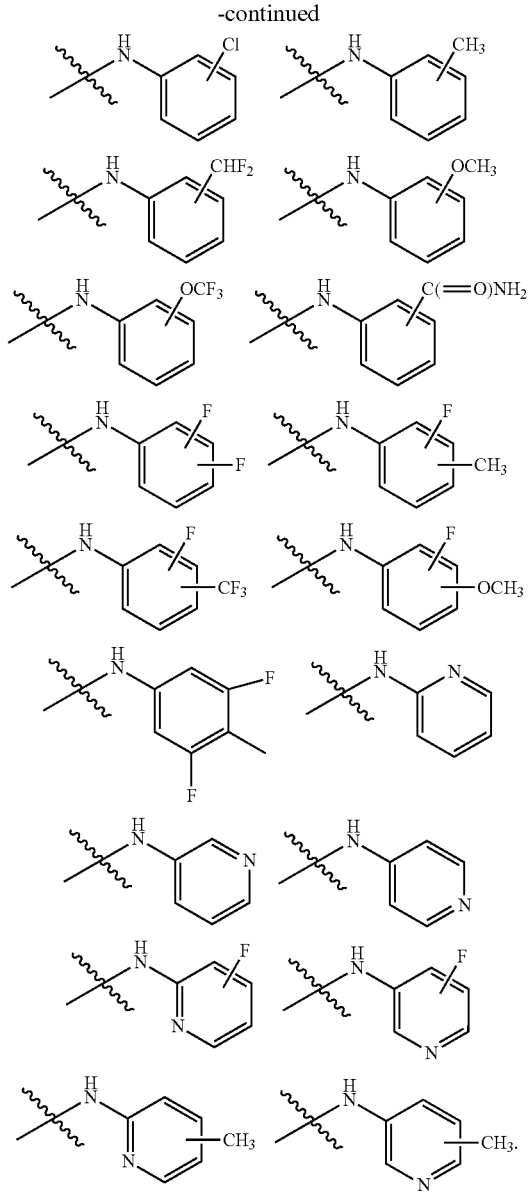

11. The compound according to claim 1, or a pharmacologically acceptable salt thereof, wherein the compound is selected from the group consisting of:

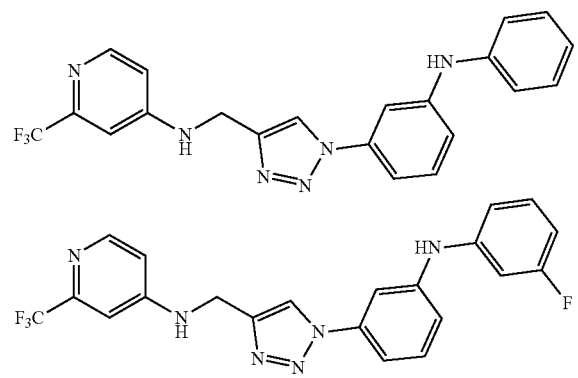

-continued
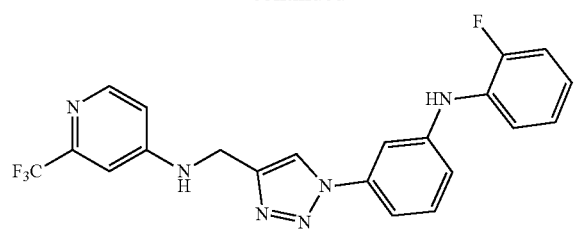
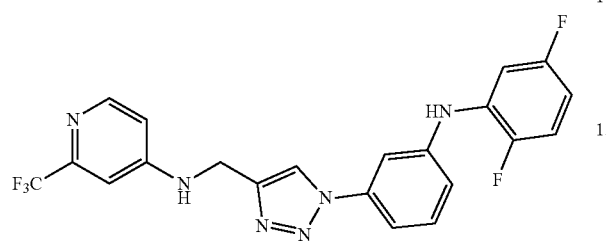
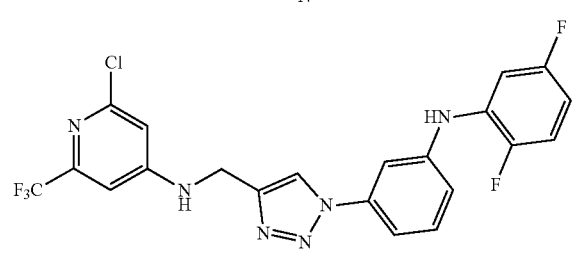
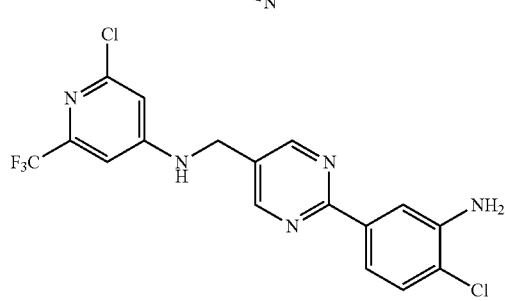
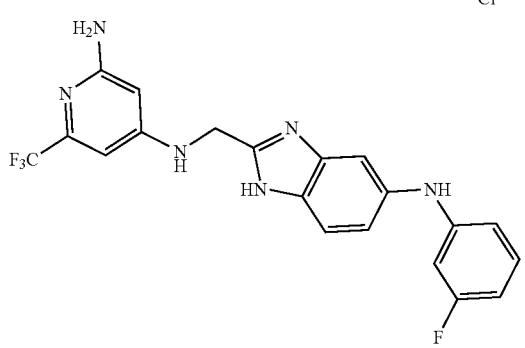
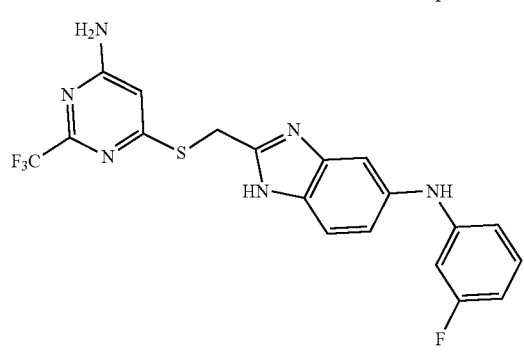
-continued
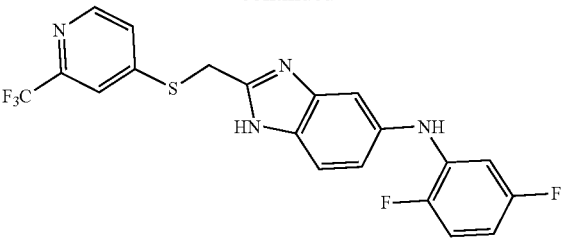
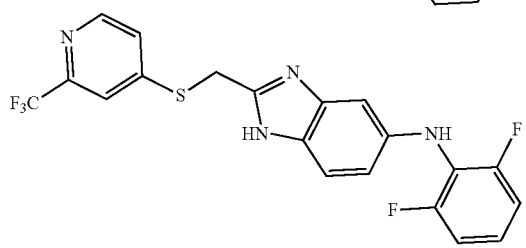
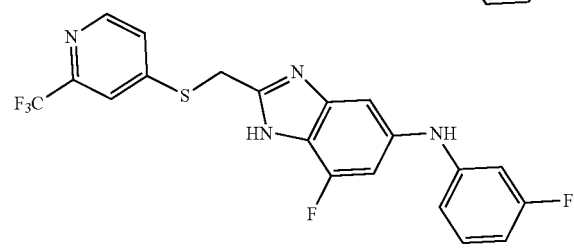
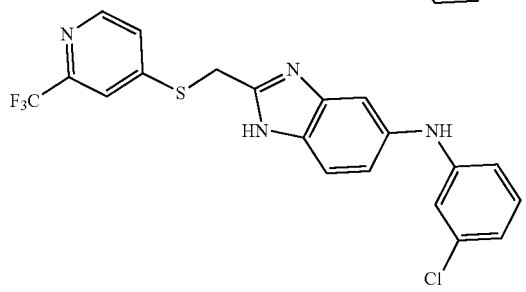
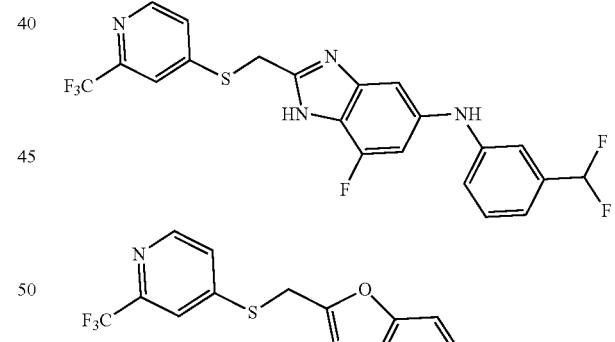
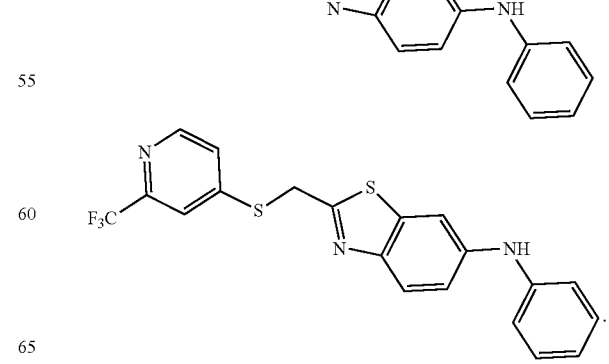

12. A pharmaceutical composition that comprises one or more compound(s) according to claim 1 and, optionally, at least one carrier substance, excipient and/or adjuvant.

13. A combination preparation comprising at least one compound according to claim 1, and at least one antibiotic as a further active ingredient.

14. The compound according to claim 1, the pharmaceutical composition according to claim 12, or the combination preparation of claim 13 for use as a medicament.

15. A coating for medicinal devices containing at least one compound according to claim 1.

* * * * *